(12) United States Patent
Velammal et al.

(10) Patent No.: US 12,014,195 B2
(45) Date of Patent: *Jun. 18, 2024

(54) SYSTEM FOR PROVIDING AN ADAPTABLE PLUGIN FRAMEWORK FOR APPLICATION TRANSFORMATION TO CLOUD

(71) Applicant: Cognizant Technology Solutions India Pvt. Ltd., Chennai (IN)

(72) Inventors: Parasu Pillai Iyappan Velammal, Chennai (IN); Kumaresan Ramachandran, Chennai (IN); Karthikeyan Mohan, Chennai (IN); Jeyashree Pandian Duraipandian, Chennai (IN); Madhusudhan Venkatesan, Chennai (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 404 days.

This patent is subject to a terminal disclaimer.

(21) Appl. No.: 17/553,972

(22) Filed: Dec. 17, 2021

(65) Prior Publication Data
US 2022/0164207 A1    May 26, 2022

Related U.S. Application Data

(63) Continuation-in-part of application No. 16/835,694, filed on Mar. 31, 2020, now Pat. No. 11,237,941.

(30) Foreign Application Priority Data

Dec. 12, 2019 (IN) .............................. 201941051520

(51) Int. Cl.
*H04L 12/24* (2006.01)
*G06F 8/41* (2018.01)
(Continued)

(52) U.S. Cl.
CPC .......... *G06F 9/45516* (2013.01); *G06F 8/423* (2013.01); *G06F 9/44505* (2013.01); *G06F 11/0772* (2013.01); *G06F 11/3604* (2013.01)

(58) Field of Classification Search
CPC .. G06F 9/45516; G06F 9/44505; G06F 8/423; G06F 11/0772; G06F 11/3604
See application file for complete search history.

(56) References Cited

U.S. PATENT DOCUMENTS 8,739,150 B2    5/2014 Gass
9,411,562 B2    8/2016 Venkata Naga Ravi
(Continued)

OTHER PUBLICATIONS

Armin Balalaie et al., Migrating to Cloud-Native Architectures Using Microservices: An Experience Report, Jul. 29, 2015, [Retrieved on Feb. 21, 2024]. Retrieved from the internet: <URL: https://arxiv.org/pdf/1507.08217.pdf> 15 Pages (1-15) (Year: 2015).*

(Continued)

*Primary Examiner* — Anibal Rivera
(74) *Attorney, Agent, or Firm* — CANTOR COLBURN LLP

(57) ABSTRACT

A system and a method for application transformation to cloud by conversion of an application source code to a cloud native code is provided. First and second transformation recommendation paths are received and remediation templates based on the same are applied. A pre-defined transformation process flow is applied on application source code based on first and second transformation recommendation paths including a pre-processing stage involving analysis of source code and target framework. A plugin unit is provided which provides an adaptable plugin framework for creating multiple plugin types. The adaptable plugin framework allows addition of semi-automated workflow that applies functionality to accelerate application development or application to cloud transformation or addition of semi-auto- (Continued)

mated steps to accelerate greenfield application development and application source code transformation to cloud native code. The functionality may include assessment of application source code and generation of application source code.

26 Claims, 23 Drawing Sheets

(51) Int. Cl.
   *G06F 9/445* (2018.01)
   *G06F 9/455* (2018.01)
   *G06F 11/07* (2006.01)
   *G06F 11/36* (2006.01)
   *H04L 12/26* (2006.01)

(56) References Cited

U.S. PATENT DOCUMENTS

| | | | |
|---|---|---|---|
| 9,519,465 | B2 | 12/2016 | Bernecker |
| 9,608,931 | B2 | 3/2017 | Sharma |
| 10,114,616 | B2 | 10/2018 | Delaney |
| 10,120,670 | B1 | 11/2018 | Atkinson |
| 10,255,081 | B2 | 4/2019 | Bijani |
| 10,452,444 | B1 | 10/2019 | Jibaja |
| 10,713,664 | B1 | 7/2020 | Alagappan |
| 10,728,364 | B1 | 7/2020 | Licata |
| 10,778,513 | B2 | 9/2020 | Kishen |
| 10,872,029 | B1 | 12/2020 | Bawcom |
| 2011/0296391 | A1 | 12/2011 | Gass |
| 2013/0007216 | A1 | 1/2013 | Fries |
| 2014/0156813 | A1* | 6/2014 | Zheng ............. H04L 67/10 709/220 |
| 2014/0359128 | A1* | 12/2014 | Bhattacharya ........ G06F 9/4856 709/226 |
| 2014/0359129 | A1 | 12/2014 | Sharma |
| 2015/0261766 | A1 | 9/2015 | Apte |
| 2017/0012854 | A1 | 1/2017 | Balasubramanian |
| 2017/0161044 | A1 | 6/2017 | Singh |
| 2017/0177324 | A1 | 6/2017 | Frank |
| 2017/0180266 | A1 | 6/2017 | Frank |
| 2017/0180459 | A1 | 6/2017 | Frank |
| 2017/0180487 | A1 | 6/2017 | Frank |
| 2018/0285572 | A1 | 10/2018 | Hanner |
| 2019/0121566 | A1 | 4/2019 | Gold |
| 2019/0121889 | A1 | 4/2019 | Gold |
| 2019/0030119 | A1 | 10/2019 | Atkinson |
| 2020/0133651 | A1 | 4/2020 | Holzer |
| 2020/0019550 | A1 | 6/2020 | Kishen |
| 2020/0195500 | A1 | 6/2020 | Kishen |
| 2020/0278920 | A1 | 9/2020 | Khakare |
| 2020/0387357 | A1 | 12/2020 | Mathon |

OTHER PUBLICATIONS

Dennis Gannon et al., Cloud-Native Applications, 2017, [Retrieved on Feb. 21, 2024]. Retrieved from the internet: <URL: https://ieeexplore.ieee.org/stamp/stamp.jsp?arnumber=8125550> 6 Pages (16-21) (Year: 2017).*

"Accenture cloud application migration services"; Jul. 7, 2014 (https://www.accenture.com/_acnmedia/Accenture/Conversion-Assets/DotCom/Documents/Global/PDF/Technology_9/Accenture-Cloud-Application-Migration-Services.pdf).

"Shifting Gears for Cloud Transformation" May 15, 2018 (https://www.csscorp.com/wp-content/uploads/2018/05/Cloud-Transformation-Services_Brochure_A5.pdf).

Lukas Hahmann et al., Migrating code into the cloud, Aug. 28, 2015, [Retrieved on Aug. 4, 2021] Retrieved from the Internet<URL: https://citeseerx.ist.psu.odu/viewdoc/download?doi=10.1.1.7070.1181&rep=rep1&type=pdf> 86 pages (1-77) (year: 2015).

Mohammad Hajjat et al., Cloudward Bound Planning for Beneficial Migration of Enterprise Applications to the Cloud, 2010 [Retrieved on Aug. 4, 2021] Retrieved from Internet: <URL:htps://dl.acm.org/doi/pdf/10.1145/1851275.1851212> 12 pages (243-254) (Year: 2010).

Zhenggong Cai et al., A Pattern-Based Code Transformation Approach for Cloud Application Migration, 2015 IEEE [Retreived on Aug. 4, 2021] Retrieved from Internet:<URL:https://ieeexplore.ieee.org/stamp/stamp.jsp?tp=&arnumber=7214025> 8 pages (33-40) (Year: 2015).

* cited by examiner

Choose automated processes to navigate your application transformation and cloud journey. The processes use highly efficient tooling to reduce time and cost of Application Transformation.

Assess Application Cloud Readiness
Target platform specific cloud suitability analysis of one or more applications within few minutes View Workflow steps

.Net Framework App Transformer
Transform legacy DotNet Framework application to be complaint with DotNet care View Workflow steps

Accelerate Microservices Development
Semi-automated process flow for greenfield microservices code analysis View Workflow steps

Move Application to Cloud
Semi-automated process for cloud suitability analysis, targeted source code transformations, and creation and triggering of CV...

View Workflow steps

FIG. 4L

Transformation Results .Net Code Analysis Results

| Project(s) | Transformation success/failure |
|---|---|
| Portfolio_management_lib | ✓ |
| Portfolio_management_app | ✓ |

Transformation Applied
Below are the transformations applied in the source code.
- Updated project with .Net core artifacts.
- Updated appsettings JSON file in the .Net Core project.
- Excluded Assembly Info.cs file from compilation for .Net Core.
- Migrate APIs from EF6 to EF core.
- Updated appsettings JSON file in the .Net Core project.
- Custom startup.cs filename and classname have been replaced to avoid conflict between Custom Startup file and .Net Core Standard Startup file.
- Updated Nuget references from .Net Framework project file to their .Net Core equivalent versions/formats.
- Updated the Http cookie API from.NET Framework to a .Net Core complaint API.
- Migrate APIs from EF6 to EF Core.
- WebAPI related APIs migrated to .Net Core.
- MVC related APIs migrated to .Net Core.
- Migrated .Net Compiler Platform ("Roslyn") as a service APIs.
- HTTP-Context properties in Class files are updated to .Net Core complaint APIs.
- Migrated System.Web namespaces to .NET Core.

FIG. 4P

.Net Framework App Transformer

Transform legacy DotNet Framework applications to...

Run as Workflow Plugin

Author:Madhusudhan.Venkatesan@cognizant.com

Platform Plugin                                V7.2.0

ConfigMaps Generator

This plugin can be used to migrate the application ...

Java Run as Custom Tranformation Recommendation Path

Plugin Author:Madhusudhan.Venkatesan@cognizant.com

Platform Plugin                                V3.0.0

Enable registration of my own Upshift Plugins

This option allows to add Plugins for which the source may not have been verified. These plugins may not be from a legimate source. Enable the option at your own risk.

Register plugin using running URL

If you have an application running locally or on cloud, you can register it as an plugin using the running URL. Make sure that the Application transformation to cloud engine(Upshift container in case of doctor and K8s installers) and the plugin can communicate.

Upload Plugin

Register the plugins here:

1. Plugins can be downloaded from product-download email.
2. Community Plugins are contributed by plugin authors within cognizant and can be downloaded from here:
   https://codehub.cognizantproducts.com/project/5f8ef4e5b94caa00313c3c2f/usage
3. You can bring your own Plugins.

FIG. 4Q

Choose automated processes to navigate your application transformation and cloud journey. The processes use highly efficient tooling to reduce time and cost of Application Transformation.

Assess Application Cloud Readiness
Target platform specific cloud suitability analysis of one or more applications within few minutes View Workflow steps

.Net Framework App Transformer
Transform legacy DotNet Framework application to be compliant with DotNet core View Workflow steps

Accelerate Microservices Development
Semi automated process flow for greenfield microservices code analysis View Workflow steps

Move Application to Cloud
Semi-automated process for cloud suitability analysis, targeted source code transformations, and creation and triggering of CV...

View Workflow steps

FIG. 4R

SYSTEM FOR PROVIDING AN ADAPTABLE PLUGIN FRAMEWORK FOR APPLICATION TRANSFORMATION TO CLOUD

CROSS-REFERENCE TO RELATED APPLICATIONS

This application is a continuation in part of U.S. application Ser. No. 16/835,694 filed on Mar. 31, 2020, now U.S. Pat. No. 11,237,941, which claims the benefit of priority to Indian Patent Application No. 201 941 051 520 filed on Dec. 12, 2019, the disclosure of which is hereby expressly incorporated.

FIELD OF THE INVENTION

The present invention relates generally to the field of cloud migration and application transformation. More particularly, the present invention relates to a system for providing an adaptable plugin framework for application transformation to cloud and greenfield cloud native development.

BACKGROUND OF THE INVENTION

With more and more infrastructure and applications moving to cloud in support of digital transformation, cloud migration and application transformation are getting complex and expensive. Before the advent of cloud platforms, custom applications were developed in programming languages like Java, C #etc., and applicable best practices and standards were followed. However, in order to take advantage of benefits provided by cloud platforms, several organizations are increasingly striving to move their application to cloud platform. It has been observed that some of the practices (like writing logs to the file system) in these applications are not compatible with cloud platforms. Hence, source code for these applications need modification before moving them to the cloud platform.

Typically, migration teams analyze and determine the best approach for application cloud transformation based on trial and error. This is, however a very long and time-consuming process. Further, the application transformation to cloud requires intensive manual process steps that could extend up to a few months depending on the complexity. It has been observed that existing techniques of moving application to cloud is predominantly a manual, error-prone process often resulting in high rework and maintenance efforts.

Further, currently, there is no common platform available where tried and tested solutions can be referenced for future transformations. Different tools are available in the market but these tools are suited to address only a particular need. Therefore, as different tools are used for the cloud migration process, there is an increased complexity and cost for the clients. There are also different transformation scenarios known across different knowledge acquiring phases. However, in the whole process, knowledge gained by the teams while migrating the applications to cloud somewhere gets lost. Enterprises struggle to find qualified cloud architects and engineers to implement the same.

In light of the above drawbacks, there is a need for a system and a method for carrying out efficient and structured migration of applications to cloud. There is a need for a system and a method of cloud migration with minimum human intervention. Further, there is also a need for reducing duration of application to cloud transformation.

SUMMARY OF THE INVENTION

In various embodiments of the present invention, a system for application transformation to cloud by conversion of an application source code to a cloud native code is provided. The system comprises a memory storing program instructions and a processor configured to execute program instructions stored in the memory. The system comprises an application transformation to cloud engine executed by the processor and configured to receive a first and a second transformation recommendation paths. The application transformation to cloud engine is configured to apply a set of remediation templates based on the first and the second transformation recommendation paths. The set of remediation steps comprises pre-defined parameterized actions. The application transformation to cloud engine is configured to apply a pre-defined transformation process flow on the application source code based on the first and the second transformation recommendation paths. The pre-defined transformation process flow includes a pre-processing stage involving analyzing the source code and a target framework, and determination of dependencies. The pre-defined transformation process flow is executed in a "detect" phase, "analyze" phase and "transform" phase and wherein the "detect" phase determines if the pre-defined transformation process flow is applicable to the application source code. The application transformation to cloud engine is configured to apply a reusable service template on the application source code, based on the first and the second transformation recommendation paths where the reusable service template applies repeatable code changes required for integration and deployment of the cloud native code to a cloud platform.

In another embodiment of the present invention, the system comprises a plugin unit configured to provide an adaptable plugin framework for creating plugin types as per required specifications. In yet another embodiment of the present invention, the adaptable plugin framework allows addition of a semi-automated workflow that applies a functionality to accelerate application development or application to cloud transformation or addition of a set of semi-automated steps to accelerate greenfield application development and application source code transformation to cloud native code. The functionality may include assessment of application source code and generation of application source code.

In various embodiment of the present invention, the adaptable plugin framework is configurable to register a first plugin type via a zipped package, wherein the plugin unit manages lifecycle of the first plugin type. In yet another embodiment of the present invention, the adaptable plugin framework is configurable to register a second plugin type by providing the second plugin type in an application's local or external-running Uniform Resource Locator (URL). In another embodiment of the present invention, the adaptable plugin framework is configured to register a third plugin type by uploading a zipped package. The plugin unit automates user interface (UI) creation for an input page and results page of the third plugin type.

In various embodiment of the present invention, the adaptable plugin framework is configurable to register a fourth plugin type. The plugin unit runs the fourth plugin type as a transformation recommendation path within existing semi-automated workflow for application source code transformation to cloud native code. In another embodiment of the present invention, the plugin unit is configured to provide a yml based language agnostic model to register and run the plugin types.

In yet another embodiment of the present invention, the plugin unit is configured to allow registration of the fourth plugin type as a set of automated steps that may be added as a custom transformation recommendation path in the first and the second transformation recommendation paths to transform the application source code to the cloud native code.

In another embodiment of the present invention, the plugin unit is configured to allow registration of the fourth plugin type as a set of semi-automated steps that are added as a custom greenfield transformation path to accelerate greenfield application source code development. In another embodiment of the present invention, the plugin unit is configured to allow registration of the second plugin type as a custom semi-automated workflow that applies a functionality to accelerate application greenfield development or application source code transformation to native code by loading a User Interface (UI) within the application transformation to cloud engine using a Uniform Resource Locator (URL) provided during registration of the second plugin type. The second plugin type is supported in local and docker installers.

In another embodiment of the present invention, the plugin unit is configured to allow registration of the third plugin type as a custom semi-automated workflow that applies a functionality to accelerate application source code greenfield development or application source code transformation to cloud native code. In yet another embodiment of the present invention, the plugin unit is configured to receive inputs in the form of a JSON file during registration.

In yet another embodiment of the present invention, the plugin unit comprises a data persistence unit to store plugin data as key-value pairs. In another embodiment of the present invention, the plugin unit is configured to enable or disable the plugin types, filter the plugin types via a programming language, search the plugin types using keywords, provide help information pertaining to the plugin types, and delete the running plugin types. In yet another embodiment of the present invention, the plugin unit supports a second plugin type, a third plugin type and a fourth plugin type when the application transformation to cloud engine is running locally or as a docker or on cloud platform.

In another embodiment of the present invention, the plugin unit receives a status message via an API call or via a javascript from a first plugin type and a second plugin type. In yet another embodiment of the present invention, the plugin unit comprises a third plugin type and a fourth plugin type which are short running processes and the plugin unit automatically estimates when the third plugin type and the fourth plugin type complete execution.

In another embodiment of the present invention, the plugin unit is configured to pass an output json path while invoking a start up script for a fourth plugin type for estimating whether the process has succeeded or failed. In yet another embodiment of the present invention, the plugin unit is configured to read plugin metadata and register the plugin types based on a manifest file loaded within a zipped package of the plugin type.

In another embodiment of the present invention, the plugin unit comprises a manifest file that carries plugin metadata of the plugin type to be registered. In yet another embodiment of the present invention, the plugin unit provides an option to add one or more new plugin types in a semi-automated workflow to perform application source code transformation to cloud native code or development activity. The new plugin type may be a plugin type that integrates Command Line Interface (CLI) based tools and downloads and leverages Open-Source Software (OSS) tools in the semi-automated workflow.

In another embodiment of the present invention, the plugin unit is configured to read information provided in a plugin manifest file including name, description, plugin type, plugin manifest file version, plugin author, plugin implementation language, and a target source code language on which the plugin runs to accelerate greenfield application development or application transformation to cloud.

In yet another embodiment of the present invention, the plugin unit comprises an Artificial Intelligence (AI) unit configured to identify suitable plugin types for a required application cloud transformation or greenfield application development. In another embodiment of the present invention, the AI unit is configured to collect information from a user and based on the application source code uploaded by the user provide suggestions to the user related to a suitable plugin type for the application source code cloud transformation. The AI unit is configured to provide suggestions related to a suitable plugin type for greenfield application development based on application source code uploaded by the user and provide suggestions related to suitable plugin types based on user behavior. In yet another embodiment of the present invention, the AI unit is configured to observe user behavior for suggesting a suitable plugin type and answer queries received from the user.

BRIEF DESCRIPTION OF THE ACCOMPANYING DRAWINGS

The present invention is described by way of embodiments illustrated in the accompanying drawings wherein:

FIG. 4L illustrates addition of the first plugin type or the second plugin type or the third plugin type semi-automted workflow, in accordance with an embodiment of the present invention;

FIG. 4O illustrates plugin screens that are displayed within the user interface of the plugin unit, in accordance with an embodiment of the present invention;

FIG. 4P illustrates results page of the plugin types displayed within the user interface of the plugin unit, in accordance with an embodiment of the present invention;

FIG. 4Q illustrates an example of the fourth plugin type where the fourth plugin type runs as the transformation recommendation path within existing semi-automated workflow, in accordance with an embodiment of the present invention;

FIG. 4R illustrates a selection menu of the transformation recommendation paths for the fourth plugin type, in accordance with an embodiment of the present invention;

DETAILED DESCRIPTION OF THE INVENTION

The present invention discloses a system and a method for executing a semi-automated workflow for application transformation and cloud migration. Further, the present invention discloses a system and a method where pre-defined transformation process flows serve as starting points for cloud migration. The present invention, further, provides for a single platform that is capable of employing reusable techniques across different transformation scenarios for migration of application to cloud.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
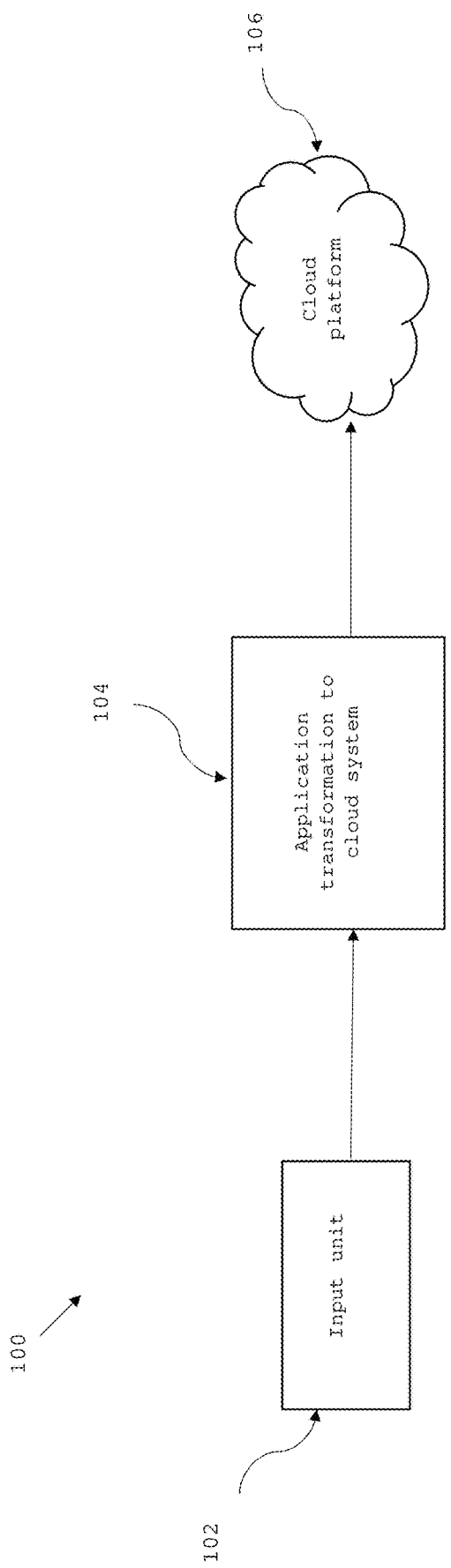
FIG. 1 is a block diagram of a system for application transformation to cloud, in accordance with an embodiment of the present invention.

FIG. 1 is a block diagram of an application transformation and cloud deployment system 100 for transforming an application to cloud, in accordance with an embodiment of the present invention. Referring to FIG. 1, in an embodiment of the present invention, the system 100 comprises an input unit 102, an application transformation to cloud system 104 and a cloud platform 106 where the application is to be integrated and deployed. The application transformation to cloud system 104 is configured to receive an application source code via the input unit 102. In an exemplary embodiment of the present invention, the input unit 102 is configured to receive inputs from the application source code. In another exemplary embodiment of the present invention, the input unit 102 is configured to receive inputs from a user. The application transformation to cloud system 104 is configured to transform the application source code received from the input unit 102 into a cloud native code based on pre-defined transformation process flows which is deployable on the cloud platform 106. In yet another exemplary embodiment of the present invention, the input unit 202 is a graphical user interface for receiving inputs from the user.

In various embodiments of the present invention, the cloud platform 106 may be selected by configuring migration settings specific to a selected cloud platform via a graphical user interface of the application transformation and application transformation to cloud system 104. Users may include developers and cloud architects who are responsible for cloud migration services. In an exemplary embodiment of the present invention, the code may be deployed in a pivotal cloud foundry (PCF) cloud platform 106. In another exemplary embodiment of the present invention, the code may be deployed in a Red Hat OpenShift cloud platform 106. In yet another exemplary embodiment of the present invention, the code may be deployed in an amazon web services (AWS) cloud platform 106. In another embodiment of the present invention, the code may be deployed in a microsoft azure cloud platform 106.

Figure 2:
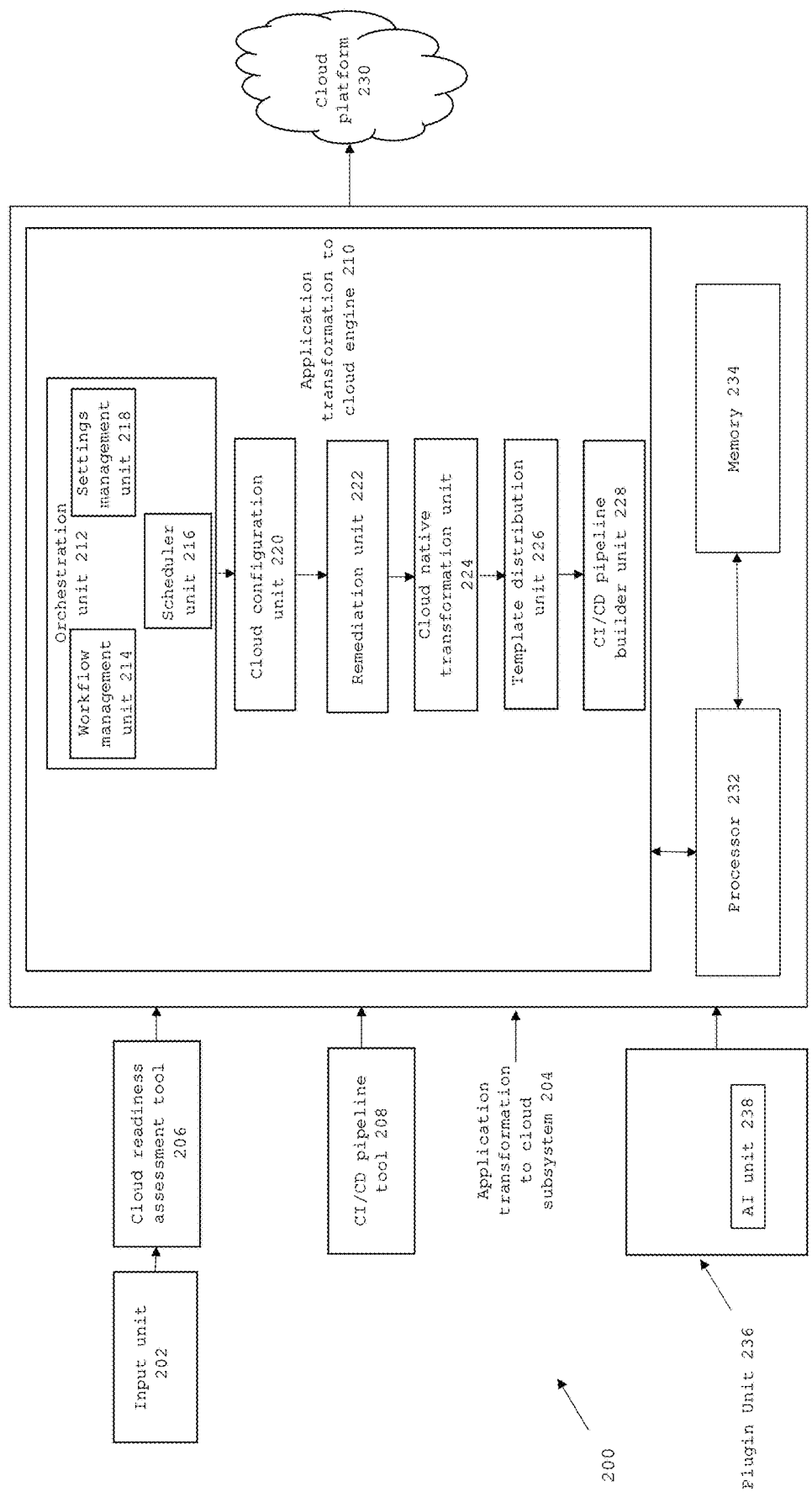
FIG. 2 is a detailed block diagram of a system for application transformation to cloud, in accordance with an embodiment of the present invention.

FIG. 2 is a detailed block diagram of an application transformation to cloud system 200 for transforming an application source code to cloud by employing a semi-automated workflow, in accordance with an embodiment of the present invention. The application transformation to cloud system 200 comprises an application transformation to cloud subsystem 204, a input unit 202, a cloud readiness assessment tool 206, a CI/CD pipeline tool 208 and a cloud platform 230. The application transformation to cloud subsystem 204 interfaces with the cloud readiness assessment tool 206 and the CI/CD pipeline tool 208 at one end and the cloud platform 230 on the other end. The cloud readiness assessment tool 206 and the CI/CD pipeline tool 208 are interfaced with the application transformation to cloud subsystem 204 via a communication channel (not shown).

In various embodiment of the present invention, a plurality of tools may be interfaced with the application transformation to cloud subsystem 204. In an embodiment of the present invention, the input unit 202 is connected to the cloud readiness assessment tool 206 via a communication channel (not shown). The communication channel (not shown) may include, but is not limited to, a physical transmission medium, such as, a wire, or a logical connection over a multiplexed medium, such as, a radio channel in telecommunications and computer networking. Examples of radio channel in telecommunications and computer networking may include, but are not limited to, message queues, HTTP API calls, a local area network (LAN), a metropolitan area network (MAN) and a wide area network (WAN).

In an embodiment of the present invention, the application transformation to cloud subsystem 204 comprises an application transformation to cloud engine 210, a processor 232 and a memory 234. In an embodiment of the present invention, the application transformation to cloud engine 210 has multiple units which work in conjunction with each other for automatic transformation of the source code and for integrating and deploying application source code on the cloud platform 230. The various units of the application transformation to cloud engine 210 are operated via the processor 232 specifically programmed to execute instructions stored in the memory 234 for executing respective functionalities of the units of the engine 210 in accordance with an embodiments of the present invention.

In another embodiment of the present invention, the subsystem 204 may be implemented as a client-server architecture. In this embodiment of the present invention, a client terminal accesses a server hosting the subsystem 204 over a communication network. The client terminals may include, but are not limited to, a smart phone, a computer, a tablet, microcomputer or any other wired or wireless terminal. The server may be a centralized or a decentralized server.

In an embodiment of the present invention, the application transformation to cloud engine 210 receives the application source code from the input unit 202 via the cloud readiness assessment tool 206. In an exemplary embodiment of the present invention, the cloud readiness assessment tool 206 may be selected by a user via the settings management unit 218 (explained in detail in later part of the specification) within the application transformation to cloud engine 210. The application transformation to cloud subsystem 204 is configured with a built-in-intelligent mechanism for automatic transformation of the application source code into a cloud native code and for integration and deployment of the application source code on a selected cloud platform 230.

Figure 4A:
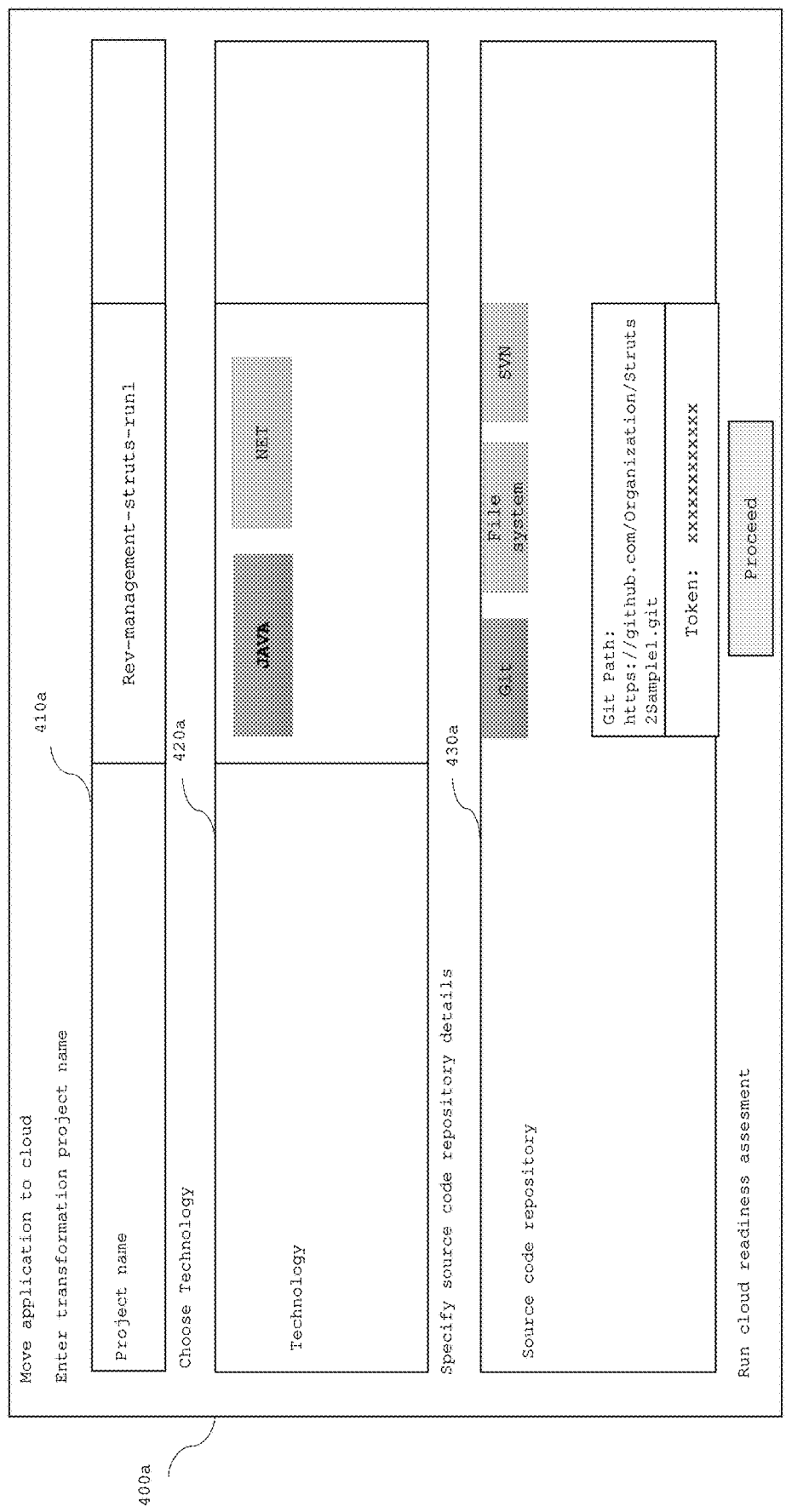
FIG. 4A is an exemplary graphical user interface through which project details and application source code are received as input, in accordance with an embodiment of the present invention.

In operation, in an embodiment of the present invention, the cloud readiness assessment tool 206 is configured to receive the application source code from the input unit 202 and assess the application source code to recommend a transformation path. In particular, for cloud readiness assessment, technology of the application source code to be assessed, a source code repository path for the source code, and the cloud platform 230 selectable by the user are rendered via the graphical user interface (as shown in FIG. 4A). Examples of the source code repository may include, but is not limited to, Subversion (SVN), Azure Repos, GitHub, Git Lab, AWS CodeCommit, and GCP Cloud Source Repositories.

In various embodiments of the present invention, the cloud readiness assessment tool 206 is configured to provide a cloud readiness assessment report. In an embodiment of the present invention, the report includes, but is not limited to, technology stack suitability, migration complexity and list of cloud antipatterns. In another embodiment of the present invention, the report may include, migration transformation recommendation paths. In an embodiment of the present invention, the migration transformation recommendation includes a first transformation recommendation path. In an embodiment of the present invention, the first transformation recommendation path may be a "replatform" path which denotes that minimal code change would be required to move the application source code to the cloud platform 230. In another embodiment of the present invention, the migration transformation recommendation includes a second transformation recommendation path. In an exemplary embodiment of the present invention, the second transformation recommendation path may be a "refactor" path which denotes that a significant amount of changes to the source code would be required to move the application source code to the cloud platform 230. In yet another embodiment of the present invention, the migration transformation recommendation includes a third transformation recommendation path. In an exemplary embodiment of the present invention, the third transformation recommendation path may be a "rehost" path which denotes that the application source code can be moved to the cloud platform 230 with some configuration changes alone. In another embodiment of the present invention, the migration transformation recommendation includes a fourth transformation recommendation path. In an exemplary embodiment of the present invention, the fourth transformation recommendation path may be a "rebuild" path which denotes that the application source code cannot be reused and new application source code is to be written to host the application source code in the cloud platform 230. In an embodiment of the present invention, out of the transformation path recommendations, the cloud readiness assessment tool 206 may suggest a particular transformation path recommendation which may be accepted by the user or may be overridden to choose another transformation path recommendation. In an exemplary embodiment of the present invention, the transformation path recommendations may be downloadable in a Common Separated Values (CSV) format.

Referring to FIG. 4A, an exemplary graphical user interface 400a is illustrated for creation of a project by specifying a project name 410a for the transformation and deployment of the application to the cloud platform 106 (as shown in FIG. 4A). In accordance with an exemplary embodiment of the present invention, technology of the application source code to be assessed 420a, a source code repository path for the source code 430a are provided as input. In an embodiment of the present invention, a message is triggered to the cloud readiness assessment tool 206 to generate a cloud readiness assessment report. This tool analyses the source code, identifies the cloud anti-patterns and provides one of the following transformation path recommendations—Rehost, Replatform, Refactor and Rebuild. The user can accept the recommendation or chose to override it by selecting another.

Figure 4B:
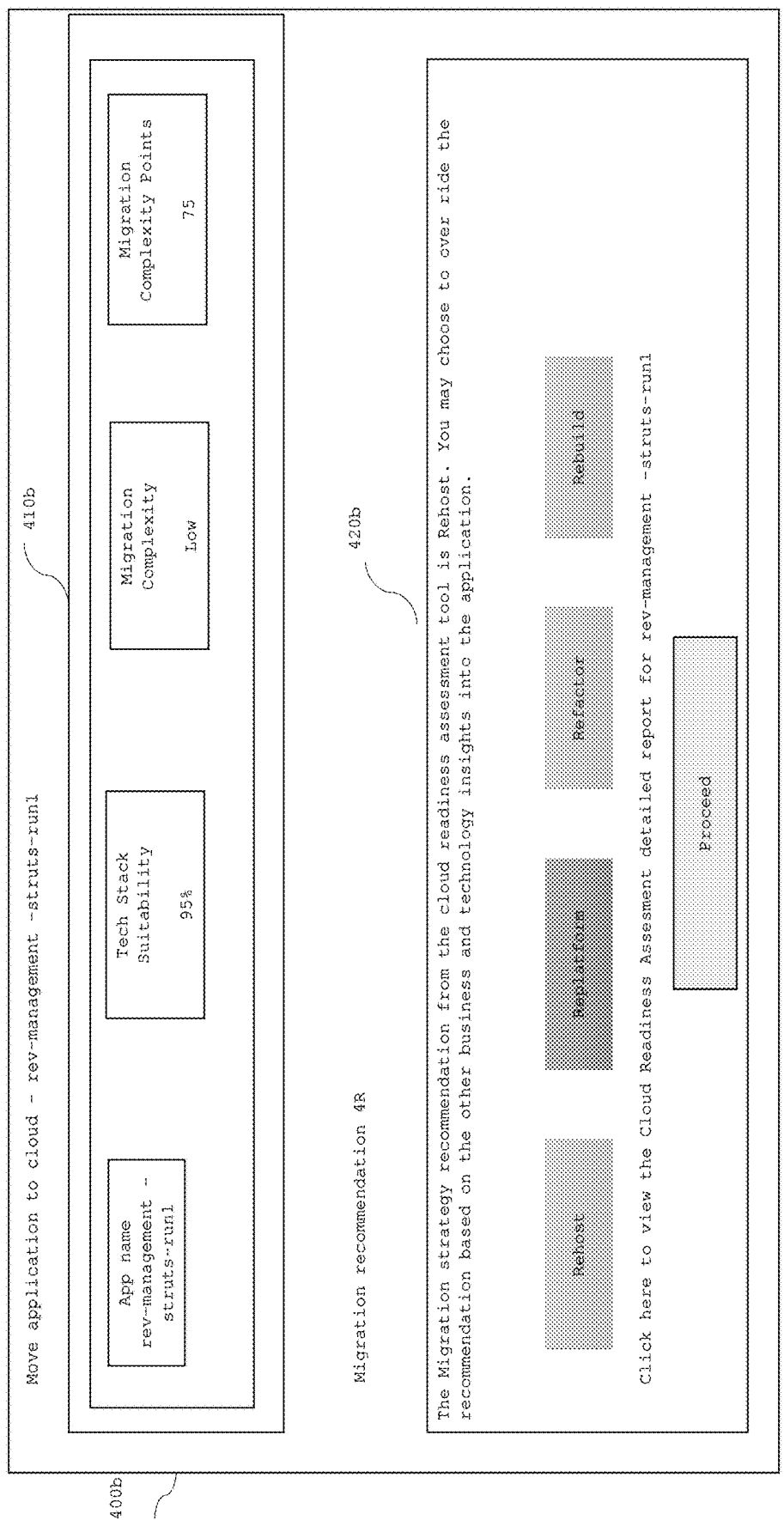
FIG. 4B is an exemplary graphical user interface through which results of cloud suitability analysis and migration strategy recommendations are rendered.

Referring to FIG. 4B, an exemplary graphical user interface 400b is illustrated showing the cloud readiness assessment results 410b. Further the transformation path recommendations 420b are provided which may be accepted by the user or may be overridden to select other recommendations.

Figure 4C:
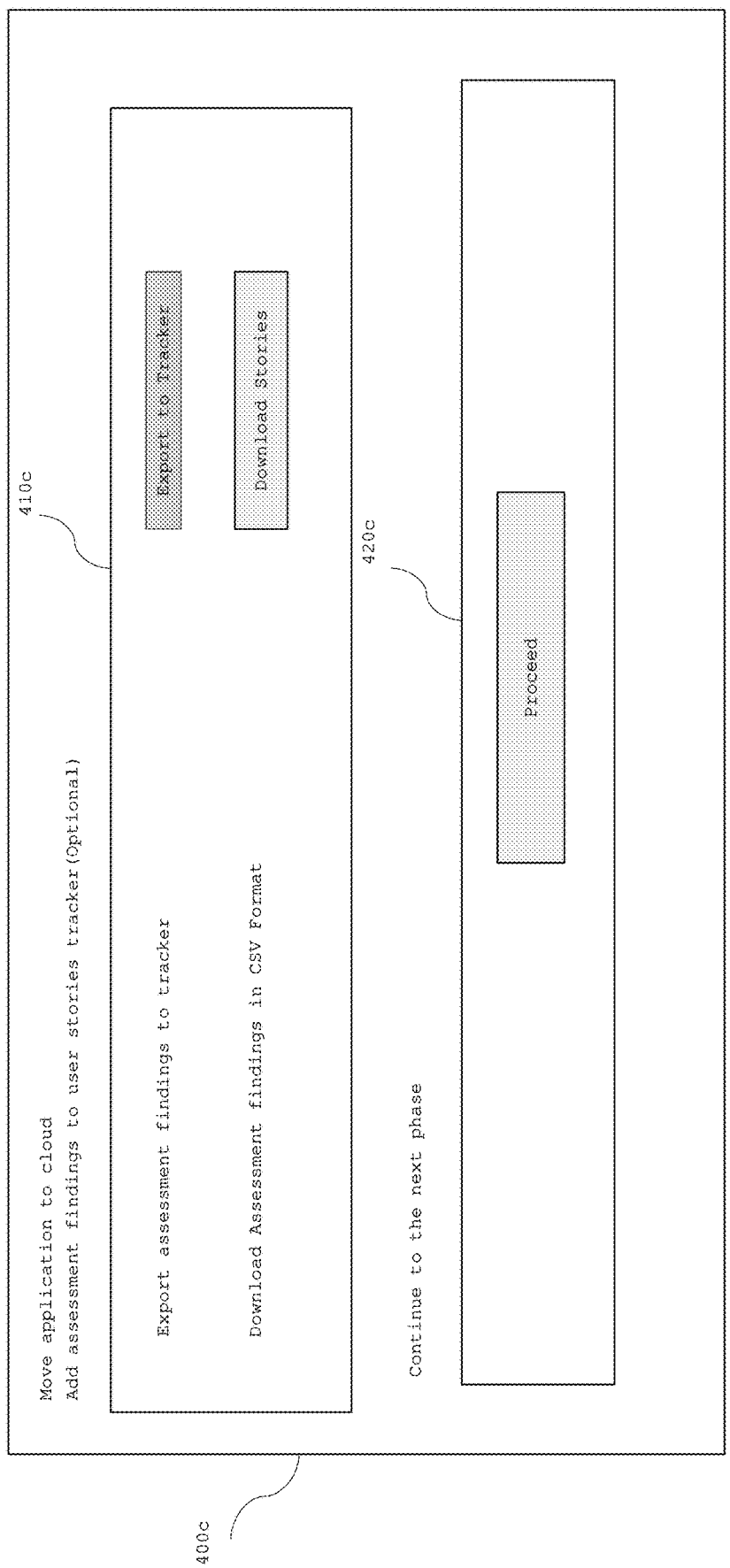
FIG. 4C is an exemplary graphical user interface that lists anti-patterns that are downloadable in a CSV file format.

Referring to the FIG. 4C, an exemplary graphical user interface 400c is illustrated which provides a list of anti-patterns that can be downloaded in CSV file format. In an embodiment of the present invention, the anti-pattern is a pattern of code that is not applicable or does not work in a cloud environment. In an example, the anti pattern may include writing logs to a local file system, instead of streaming and writing to a remote file system. In another example, anti pattern may include a plurality of files created by the local file system operation that may not be accessible to a plurality of subsequent requests. In another example, the anti patterns may include using a application sever specific library that may not be available in the cloud environment.

Figure 4D:
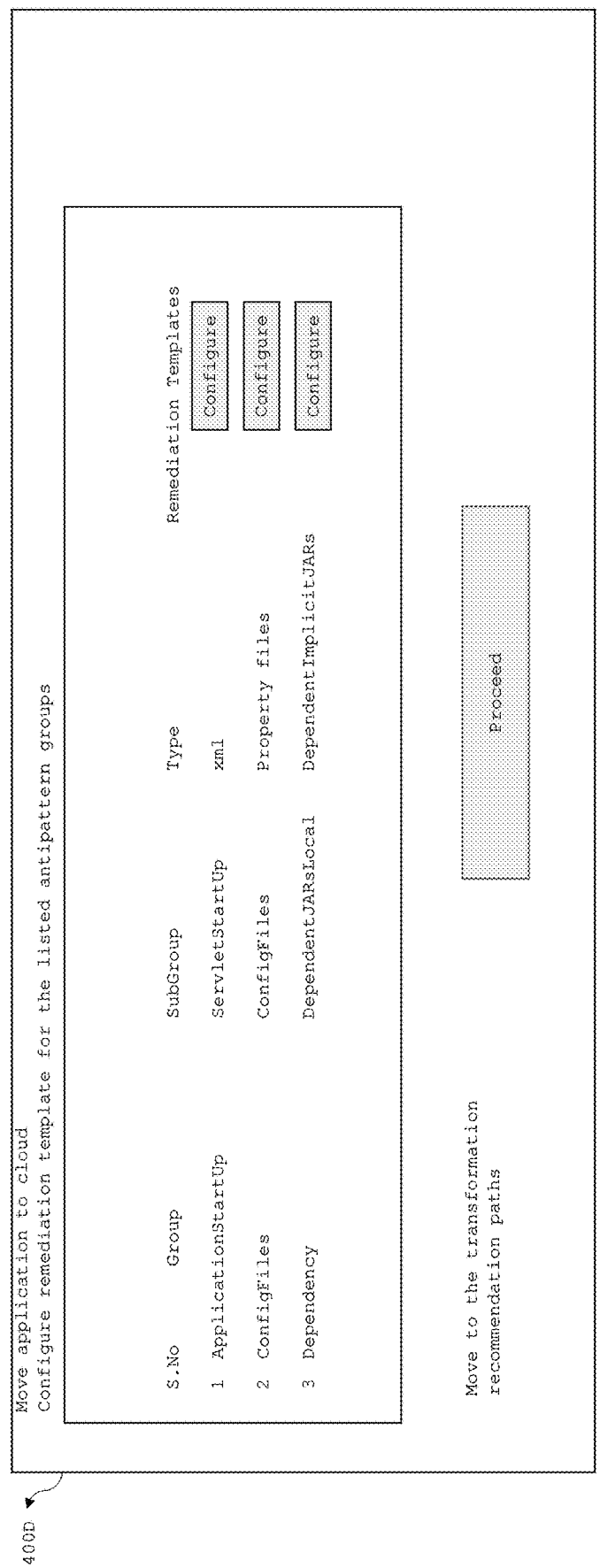
FIG. 4D is an exemplary graphical user interface that provides anti-patterns identified and a provision to associate remediation templates to remediate the anti-patterns.

Referring to the FIG. 4D, an exemplary graphical user interface 400D is illustrated which provides a list of the anti-patterns detected by the cloud readiness assessment tool and a provision to define a remediation template corresponding to the detected anti-pattern.

Figure 4E:
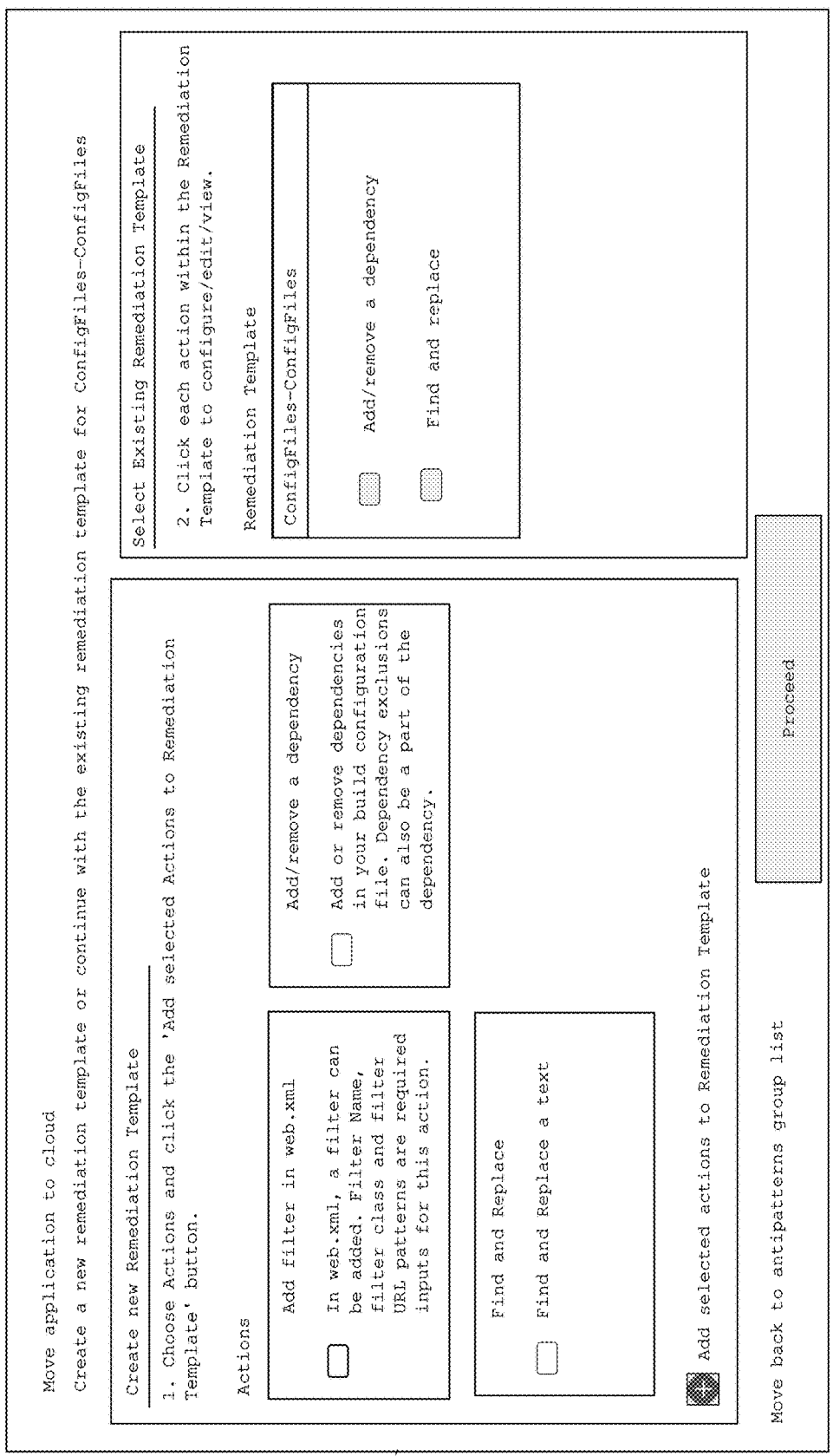
FIG. 4E is an exemplary graphical user interface that provides an option to create a new remediation template or continue with the existing remediation templates.

Referring to FIG. 4E, an exemplary graphical user interface 400E is illustrated which enables the user to either associate an existing remediation template or define a new remediation template and associate it to the detected anti-pattern. In an embodiment of the present invention, a remediation template comprises of multiple actions. In an embodiment of the present invention, the multiple actions comprise implementing a pre-defined, parameterized change to the application source code. In an example, the parametrized changes may include "find and replace a string", "add/delete an import statement", and "add/delete dependencies".

In an embodiment of the present invention, the application transformation to cloud engine 210 comprises an orchestration unit 212, a cloud configuration unit 220, a remediation unit 222, a cloud native transformation unit 224, a template distribution unit 226 and a CI/CD pipeline builder unit 228.

In an embodiment of the present invention, the orchestration unit 212 of the application transformation to cloud engine 210 is configured to execute the semi-automated workflow based on the transformation recommendation path provided by the cloud readiness assessment tool 206. The semi-automated workflow represents various stages which are executed to carry out various tasks. In an exemplary embodiment of the present invention, the semi-automated workflow for the application transformation is uniquely identified by a project name via the graphical user interface (as shown in FIG. 4A).

In an embodiment of the present invention, the orchestration unit 212 comprises a workflow management unit 214, a scheduler unit 216 and a settings management unit 218. The workflow management unit 214 is configured to list multiple semi-automated workflows to be executed by the orchestration unit 212. The workflow management unit 214 renders information on stages of execution of the workflow via the graphical user interface (as shown in FIG. 4B) Further, the workflow management unit 214 also renders a result summary of the execution of the workflow.

In an embodiment of the present invention, the scheduler unit 216 in communication with the workflow management unit 214 is configured to periodically check status of the workflow by calling an application program interface (API) end-point. In an embodiment of the present invention, the settings management unit 218 is configured to enable the user to manage selection of various transformation tools like cloud readiness assessment tool 206 and CI/CD pipeline tool 208 that would be used in the transformation of the application source code to the cloud native code and for integration and deployment of the cloud native code on the selected cloud platform 230. In an embodiment of the present invention, other tools may also be interfaced with the application transformation to cloud subsystem for the execution of the workflow. The settings management unit 218 also enables the user to define CI/CD templates and reusable service templates.

In an embodiment of the present invention, the cloud configuration unit 220 is configured to create configuration artifacts specific to the selected cloud platform 230. In an embodiment of the present invention, the cloud configuration unit 220 creates a manifest.yaml file which is used to deploy source code applications to a pivotal cloud foundry cloud platform 230. In an example, the manifest.yaml file includes the below mentioned content:
applications:
  name: SpringDemo-2
  memory: 1G
  instances: 1
  host: SpringDemo-2
  path: target/springDemo-0.0.1-SNAPSHOT.jar
  disk_quota: 1G In an embodiment of the present invention, the remediation unit 222 is configured to apply a pre-defined remediation template on the application source code. In an exemplary embodiment of the present invention, the pre-defined remediation templates may be configured by the user for multiple anti-patterns. In an embodiment of the present invention, the remediation template comprises a set of actions performed to remediate the anti-pattern identified by the cloud readiness assessment tool 206. The remediation unit 222 implements the actions defined in the remediation templates on the application source code to remediate the anti-patterns. In an embodiment of the present invention, the remediation templates are applied based on the first and the second transformation recommendation paths.

In an embodiment of the present invention, the cloud native transformation unit 224 is configured to generate a cloud native code that is compatible with the selected cloud platform 230. In an embodiment of the present invention, the application transformation to cloud engine 210 may include a plurality of cloud native transformation units 224. In an embodiment of the present invention, the cloud native transformation unit 224 is configured to implement one or more stages of the semi-automated workflow based on the first and the second migration transformation recommendation paths.

In an embodiment of the present invention, one of the stages of the workflow include applying the one or more pre-defined transformation process flows onto the application source code. In an embodiment of the present invention, the pre-defined transformation process flow has a pre-processing and post-processing stage. The pre-processing stage prepares the code on which the transformation has to be applied. In an embodiment of the present invention, the pre-processing stage involves analyzing the source code and other context like target framework and determination of dependencies and versions required provided by the user at the input unit 202. In the processing stage, each of the plurality of cloud native transformation units 224 executes transformation of the application source code to the cloud native code in three distinct phases "detect" phase, "analyze" phase and "transform" phase. In an embodiment of the present invention, the cloud native transformation unit 224 in the "detect" phase determines if the pre-defined transformation process flow is applicable to the application source code.

In an embodiment of the present invention, the cloud native transformation unit 224 in the "analyze" phase analyses the application source code and determines the changes required to be made for transformation of the application source code to the cloud native code. In an embodiment of the present invention, the cloud native transformation unit 224 in the "transform" phase transforms the application source code to the cloud native code compatible with the cloud platform 230. In the post-processing stage, execution of actions which are common for one or more cloud native transformation units 224 is performed.

In an embodiment of the present invention, the post-processing stage involves generating instructions for the users to perform a plurality of updates to the application source code. The post processing stage also includes providing additional recommendations to the users and rendering details inferenced in the pre-defined transformation process flow to other pre-defined transformation process flows. In an embodiment of the present invention, the plurality of cloud native transformation units 224 are configurable to flexibly assemble the pre-defined transformation process flows. In an embodiment of the present invention, a plurality of transformation units 224 are combined to complete a transformation process flow. In an embodiment of the present invention, a new transformation process flow may be created by combining existing and new transformation units 224.

In an exemplary embodiment of the present invention, in the "transform" phase, the pre-defined transformation process flow includes a series of steps to transform the application source code into the cloud native code. In an exemplary embodiment of the present invention, the series of steps may include, but are not limited to, addition, deletion and modification of classes of the application source code. In yet another embodiment of the present invention, the series of steps may include but are not limited to, addition, deletion and modification of configuration files. In an embodiment of the present invention, the configuration files may include a plurality of files such as .xml files, .yml files and .properties files. In an embodiment of the present invention, the modification of the configuration files may include adding a dependency to .xml file. In an embodiment of the present invention, the series of steps may include building definitions of the classes of the application source code. In an embodiment of the present invention, building definitions of the classes may include creating a .java class file.

In another embodiment of the present invention, in the "transform" phase, the pre-defined transformation process flow may include modifying a configuration of the application source code or modifying the application source code itself. In an exemplary embodiment, conversion of the application source code to the cloud native code by modifying the source code itself may include selecting a pre-defined "Struts to Spring Boot" transformation process flow. The cloud native transformation unit 224 is configured to take source code written in Struts, make a series of changes and transform it into a Spring Boot based application which may be run on the cloud platform 230. In one example, the series of changes may comprise including a spring boot starter to a dependency. In another example, the series of changes may comprise including a struts to spring plugin. In another example, the series of changes may include adding a spring boot application. In another example, the series of changes may include adding a filter registration bean to a java configuration.

In another exemplary embodiment of the present invention, conversion of the application source code to the cloud native code by modifying source code itself may include selecting a pre-defined "maven to gradle" transformation process flow. The cloud native transformation unit 224 is configured to take the source code written in Maven, make a series of changes and transform it into a Gradle based application which may be run on a cloud platform 230. In one example, the series of changes may comprise porting maven configuration to a build.gradle. In another example, the series of changes may include creating a .gradle folder with a gradle wrapper files. In another example, the series of steps may include creating settings.gradle and gradlew files.

In another exemplary embodiment of the present invention, conversion of the application source code to the cloud native code by modifying source code itself may include selecting a pre-defined "spring MVC to spring boot" transformation process flow. The cloud native transformation unit 224 is configured to take the source code written in Spring MVC, make a series of changes and transform it into a spring boot based application which may be run on a cloud platform 230. In one example, the series of changes may comprise adding a spring-boot-starter-parent to a pom.xml file. In another example, the series of changes may comprise adding the spring-boot-starter-web dependency to the pom.xml file. In another example, the series of changes may comprise adding a spring-boot-maven plugin under the build section in the pom.xml file that has a spring-web dependency. In another example, the series of changes may include adding all filters in a Web.xml as a Java configuration beans. In another example, the series of steps may include adding a tomcat-embed-jasper dependency if jsp files are present. In another example, the series of steps may include crawling through all the pom files and updating them in case of multi-module project structure.

In another exemplary embodiment of the present invention, conversion of the application source code to the cloud native code by modifying source code itself may include selecting a pre-defined "WebSphere to TomEE Build pack" transformation process flow. The cloud native transformation unit 224 is configured to take the source code written in WebSphere Application, make a series of changes and transform it to a cloud native code and deploy it into a cloud platform 230. In one example, the series of changes may comprise identifying code related to a JNDI resource look up for a data source. In another example, the series of changes may comprise extracting JDNI Data source URL and checks if an entry already exists in the Web.xml. In another example, the series of changes may comprise creating a new resource-ref entry in a web.xml. In another example, the series of changes may comprise creating a new resources.xml file if it is not already present. In another example, the series of changes may comprise making a new entry for above identified JNDI data source URL. In another example, the series of changes may comprise identifying a new data source service instance name to be created. In yet another example, the series of changes may comprise creating a manifest file with entries for a build pack (TomEE build pack) and entry for a data source service instance.

In another exemplary embodiment of the present invention, conversion of the application source code to the cloud native code by modifying source code itself may include selecting a pre-defined "Apache CXF application to Spring Boot" transformation process flow. The cloud native transformation unit 224 is configured to take the source code written in Apache CXF application, make a series of changes and transform it into a Spring Boot application which may be run on a cloud platform 230. In one example, the series of changes may comprise removing old CXF dependencies and replaces the dependencies with new spring boot starter dependencies. In another example, the series of changes may comprise adding spring boot related classes, dependencies and plugins.

In another example, the series of changes may comprise adding all the filters, servlets, listeners in the Web.xml as Java configuration beans. In another example, the series of changes may comprise adding the Application Property files in the resources folder. In yet another example, the series of changes may comprise moving all the spring configuration bean files from WEB-INF to the resources. In another example, the series of changes may comprise addressing a spring dependency management with the help of bill of material (BOM). In another example, the series of changes may comprise updating the packaging to JAR if no JSPs are found in the source code. In another example, the series of changes may comprise removing Jackson dependency version, if found. In another example, the series of changes may comprise If JNDI data sources are found in the source code, then equivalent java configuration beans are added and old configurations are commented. In another example, the series of changes may comprise in case of multi-module project structure, crawling through all the build configuration files and updating them.

Figure 4F:
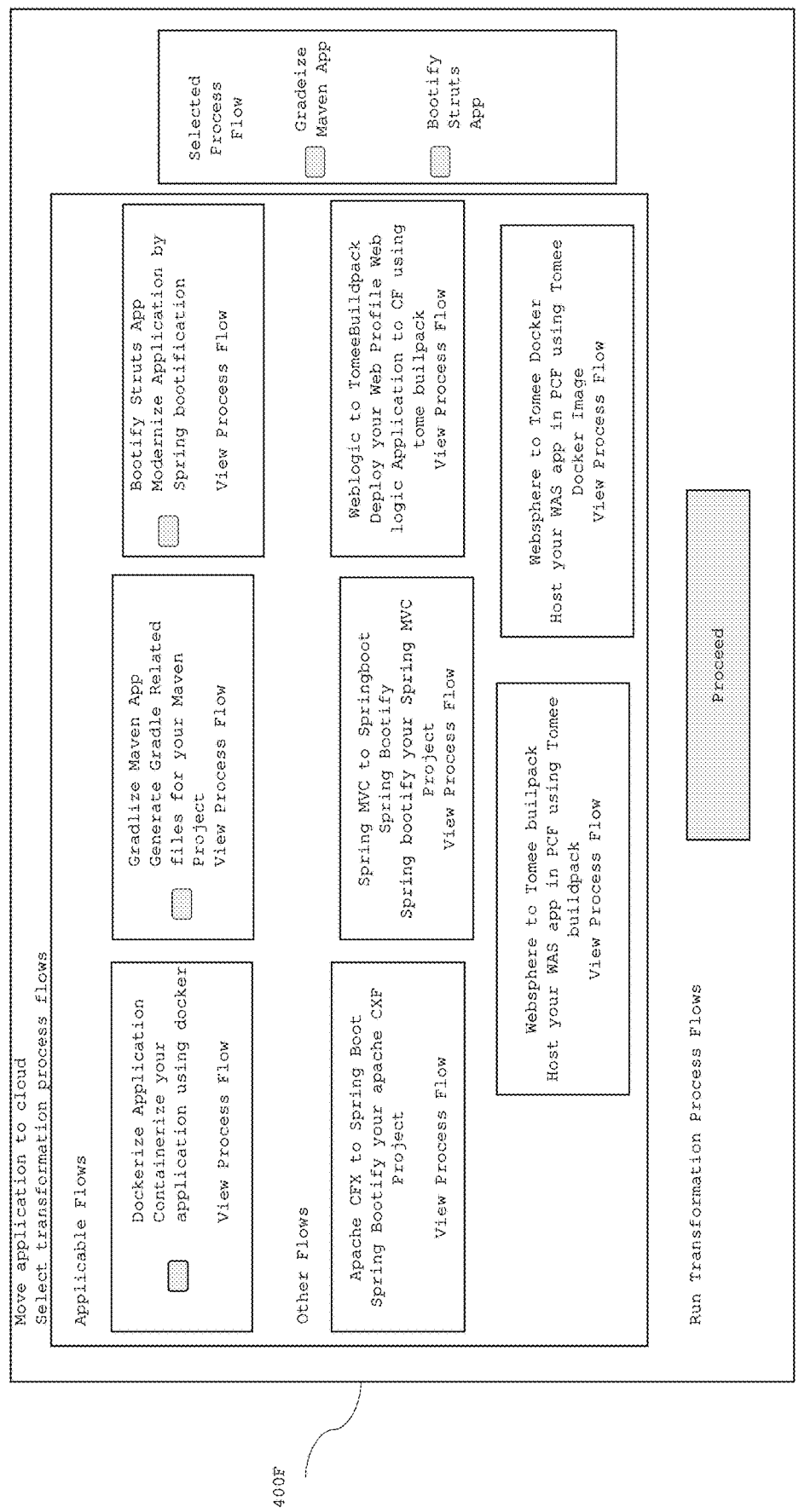
FIG. 4F is an exemplary graphical user interface that provides recommendations corresponding to a pre-defined transformation process flow specific to an application.

Referring to the FIG. 4F, a graphical user interface 400F is illustrated showing recommendations of the transformation process flows based on the first and the second transformation path recommendation selected by the user to transform the application source code into cloud native code.

In an embodiment of the present invention, after the cloud native code is generated by the cloud native transformation unit 224, the template distribution unit 226 is configured to apply reusable service templates. In an embodiment of the present invention, the reusable service templates apply repeatable code changes in the application source code. In an exemplary embodiment of the present invention, the distribution of the service templates may include distribution of a log configuration file that is to be added to the applications source codes that is being transformed to the cloud native code. In an embodiment of the present invention, the service templates are applied based on the first and the second transformation recommendation paths.

Figure 4G:
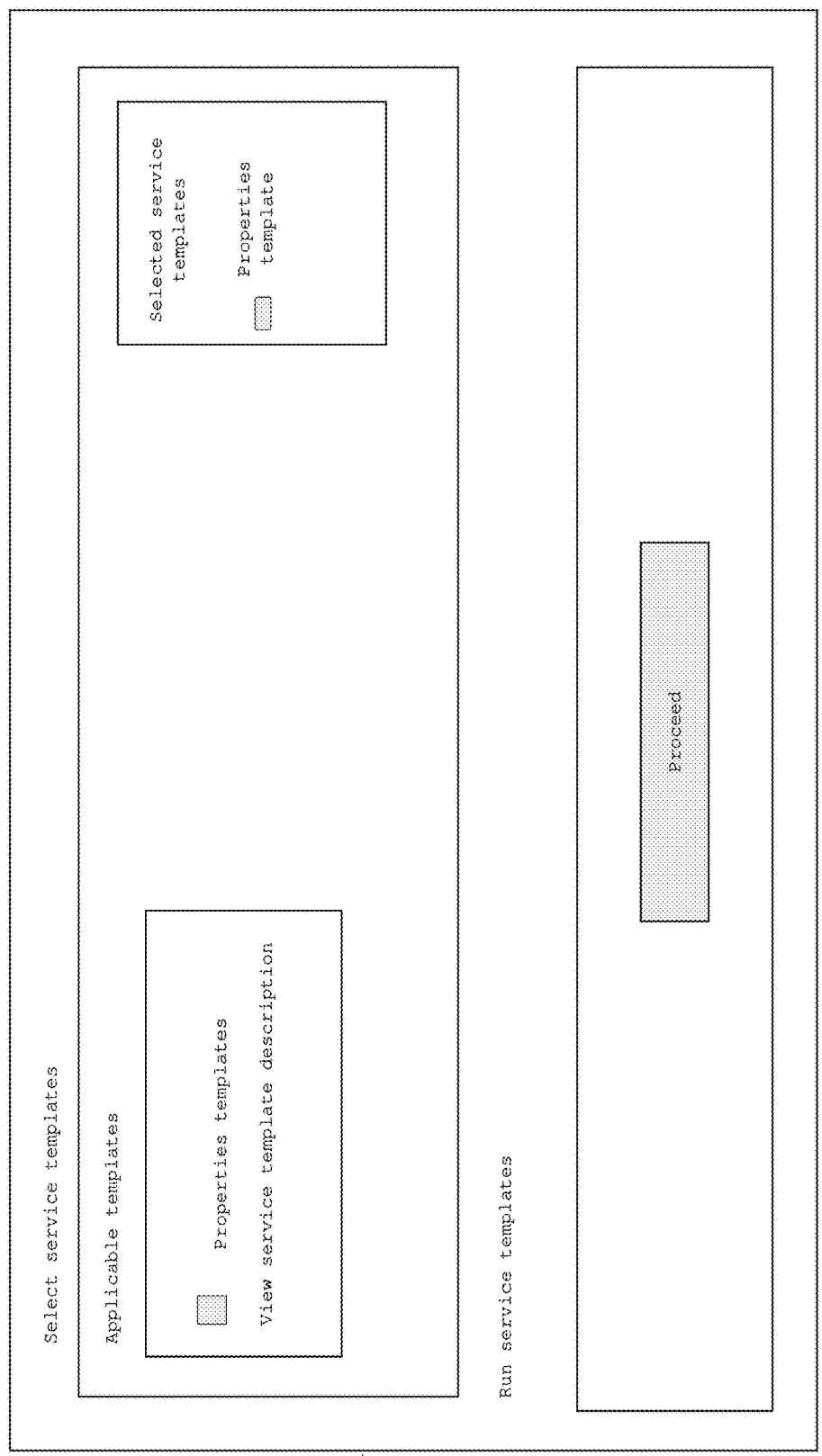
FIG. 4G is an exemplary graphical user interface that provides recommendations corresponding to a service template specific to an application.

Referring to the FIG. 4G, a graphical user interface 400G is illustrated for the selection of the service templates to add lines of code or edit build configuration in the source code.

In an embodiment of the present invention, after the distribution of service templates on the generated cloud native code, the continuous Improvement/continuous Deployment (CI/CD) pipeline builder unit 228 is configured to build a CI/CD pipeline for integration and deployment of the cloud native code to cloud platform 230. In an exemplary embodiment of the present invention, the CI/CD pipeline builder unit 228 creates a job to create the CI/CD pipeline such that the application source code is deployed onto the cloud platform 230 based on the first, second and third transformation recommendation paths. In an embodiment of the present invention, the CI/CD pipeline builder unit 228 uses the CI/CD templates defined by the users in the migration settings to create the CI/CD pipeline. In an embodiment of the present invention, support for cloud deployment is added for container and Orchestration platforms such as Docker and Kubernetes. In an embodiment of the present invention, support for kubernetes may be added by creating a CI/CD template that deploys application source code to a kubernetes cluster. In an exemplary embodiment of the present invention, the CI/CD pipeline builder unit 228 creates a new CI/CD pipeline with a plurality of user-defined stages such as unit testing, static code analysis, deployment strategy, security checks, cloud readiness analysis, and notification channels. In various embodiment of the present invention, the integration and deployment of the cloud native code on to the selected cloud platform is performed for the first, second, third and fourth migration transformation path recommendations. In an embodiment of the present invention, Github is a application source code repository platform that provides the application source code that may be deployed on the cloud platform.

Figure 4H:
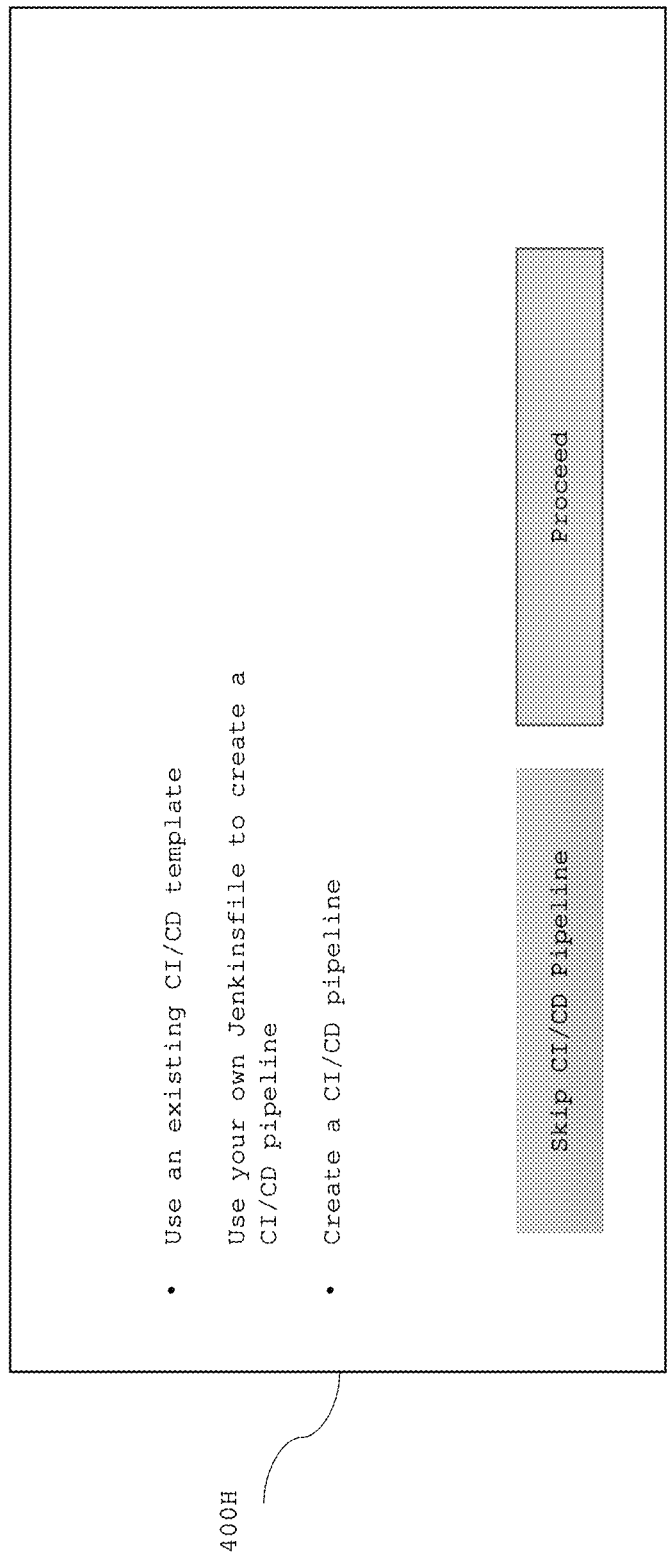
FIG. 4H is an exemplary graphical user interface that provides options to users to create Continuous integration (CI)/Continuous Deployment (CD) pipeline template.

Referring to the FIG. 4H, a graphical user interface 400H is illustrated showing options to create a Jenkins CI/CD pipeline for deployment of the source code to cloud platform 106. Either an existing CI/CD Jenkins file template may be selected or a new pipeline may be defined for the deployment of the source code to cloud platform 106.

In an embodiment of the present invention, the application transformation and cloud deployment system 100 comprises a plugin unit 236 (FIG. 2) configured to enable addition or deletion of plugins of different types into the system 100. The plugin unit 236 provides an adaptable plugin framework to register and run plugins as per required specifications. In an embodiment of the present invention, the adaptable plugin framework allows addition of a semi-automated workflow that applies a functionality to accelerate greenfield application source code development. Further, the functionality may include assessment of application source code or generation of application source code. In another embodiment of the present invention, the adaptable plugin framework allows addition of the semi-automated workflow to accelerate application source code transformation to cloud native code. In another embodiment of the present invention, the adaptable plugin framework allows addition of a set of semi-automated steps to accelerate greenfield application source code development and application source code transformation to cloud native code.

In an embodiment of the present invention, the plugin types may be a first plugin type, a second plugin type, a third plugin type and a fourth plugin type. In an exemplary embodiment of the present invention, the plugin unit 236 is configured to provide a yml based language agnostic model to register and run the plugin types. In an embodiment of the present invention, the plugin unit 236 is configured to register the first plugin type via the adaptable plugin framework by an uploaded zipped package. In another embodiment of the present invention, the plugin unit 236 allows registering and running a large number of plugin types.

Figure 4I:
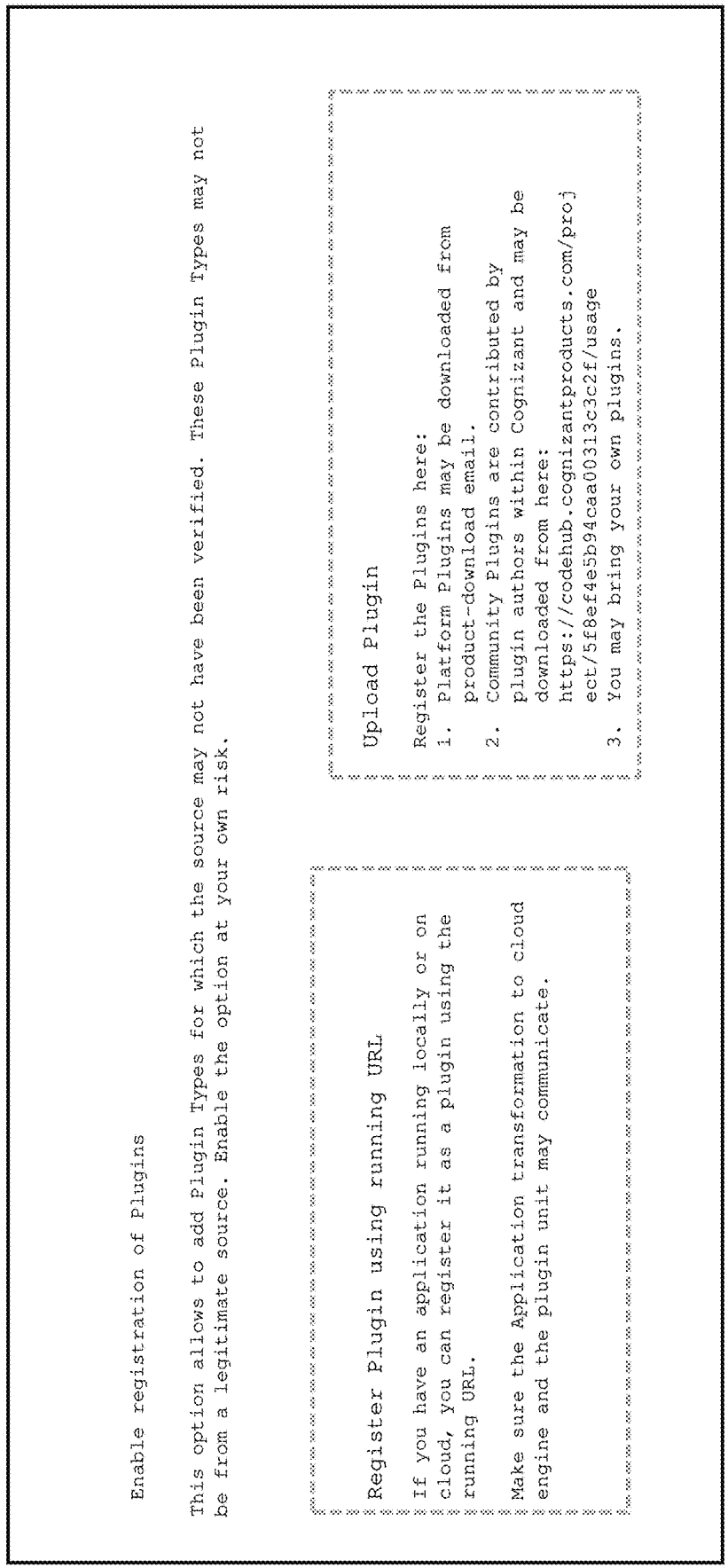
FIG. 4I illustrates a user interface rendered by a plugin unit for registering a first plugin type, a second plugin type, a third plugin type, and a fourth plugin type in accordance with an embodiment of the present invention.

The plugin unit 236 is configured to manage a complete lifecycle of the first plugin type from start to stop. In another embodiment of the present invention, the plugin unit 236 is configured to register the second plugin type via the adaptable plugin framework by providing the second plugin type an application's local or external-running Uniform Resource Locator (URL) as an input. In another embodiment of the present invention, the plugin unit 236 loads a User Interface (UI) of the second plugin type within the application transformation to cloud engine 210. In yet another embodiment of the present invention, the plugin unit 236 is configured to allow registration of the second plugin type as a custom semi-automated workflow that applies a functionality to accelerate application greenfield development or application cloud transformation by loading a User Interface (UI) within the application transformation to cloud engine using a Uniform Resource Locator (URL) provided during registration of the second plugin type. In an exemplary embodiment of the present invention, the functionality may include assessment of application source code, generation of application source code, transformation of legacy application source code to cloud native code etc. Further, any functionality may be defined by a plugin author. In an embodiment of the present invention, the second plugin type is supported in local, docker and kubernetes installers of the application transformation to cloud engine 210. In an exemplary embodiment of the present invention, FIG. 4I illustrates a user interface rendered by the plugin unit 236 for registering the first plugin type, the second plugin type, the third plugin type and the fourth plugin type by the users.

In another embodiment of the present invention, the plugin unit 236 allows users to register the second plugin type by providing a running URL of the second plugin type. While the second plugin type is running, the plugin unit 236 loads the plugin user interface within the application transformation to cloud engine 210. Further, a plugin user may run the second plugin type via the plugin unit 236 within the application transformation to cloud engine 210.

In another embodiment of the present invention, the plugin unit 236 is configured to register the third plugin type via the adaptable plugin framework by an uploaded zipped package. The plugin unit 236 automates UI creation for an input page and results page of the third plugin type based on user inputs. In an embodiment of the present invention, the plugin unit 236 allows plugin authors an option to define input page and results page for the plugin types. The plugin unit 236 receives inputs in the form of a JSON file during registration of the third plugin type and automates creation of the user interface for input page and results page of the registered plugin type.

In an embodiment of the present invention, the plugin unit 236 is configured to allow registration of the third plugin type as a custom semi-automated workflow that applies a functionality to accelerate application greenfield development or application cloud transformation. In an exemplary embodiment of the present invention, the functionality may include assessment of application source code, generation of application source code, transformation of legacy application source code to cloud native code etc.

In another embodiment of the present invention, the plugin unit 236 is configured to register a fourth plugin type via the adaptable plugin framework. The plugin unit 236 runs the fourth plugin type as a transformation recommendation path for transforming an application source code to cloud native code. In an embodiment of the present invention, the plugin unit 236 is configured to allow registration of the fourth plugin type as a set of automated steps that may be added as a custom transformation recommendation path in the first and the second transformation recommendation paths to transform the application source code to the cloud native code via the application transformation to cloud engine 210. In an embodiment of the present invention, the plugin unit 236 is also configured to allow registration of the fourth plugin type as a set of automated steps that may be added as a custom greenfield recommendation path to accelerate greenfield application source code development. In another embodiment of the present invention, the plugin unit 236 is configured to add the fourth plugin type as a custom transformation recommendation path in addition to the existing transformation recommendation path and channelize the transformation recommendation path for reuse.

In another embodiment of the present invention, the plugin unit 236 is configured to add feature upgrades to existing plugin applications registered in the plugin unit 236. In another embodiment of the present invention, the plugin unit 236 comprises a data persistence unit (not shown) to store plugin data as key-value pairs. The plugin data may be persisted in file types including, but are not limited to, .txt, .csv, .xlsx, .yml, .json, .zip, .tar.gz, .tar, .html, .dgml, and .xls. based on functionality of the plugin. In another embodiment of the present invention, the application transformation to cloud engine 210 comprises a portfolio level dashboard that provides transformation status of all initiated transformation recommendation path instances including that of the registered plugins of the application to cloud engine 210.

In another embodiment of the present invention, the plugin unit 236 is configured to enable or disable the registered plugins, filter the registered plugins via a programming language, search registered plugins using keywords, provide help information pertaining to the registered plugins, and delete registered running plugins.

In an embodiment of the present invention, the plugin unit 236 allows registration of the plugin types that are developed using programming language such as Java, .NET. In an embodiment of the present invention, the first plugin type is supported when the application transformation to cloud engine 210 is running locally. In another embodiment of the present invention, the second plugin type, the third plugin type and the fourth plugin type are supported when the application transformation to cloud engine 210 is running locally or as a docker or on cloud platform. During plugin registration, the plugin unit 236 validates whether the first plugin type, third plugin type and the fourth plugin type have the required files as a zipped package.

In an embodiment of the present invention, the first plugin type, the third plugin type and the fourth plugin type may have a set of specified file extensions such as .sh, .bat, .jar, .dll, .yml, .gif, .json, .config, .properties, .script within the zipped package. Further, the first plugin type and the second plugin type are configured to respond to the plugin unit 236 when a plugin workflow has been completed for a specific process instance. The first plugin type and the second plugin type is configured to send a status message to the plugin unit 236 via an API call or via a javascript. In an embodiment of the present invention, the third plugin type and the fourth plugin type are short running processes and the plugin unit 236 automatically estimates when the third plugin type and the fourth plugin type complete the execution.

In an embodiment of the present invention, the plugin unit 236 is configured to estimate whether a plugin process has succeeded or failed for third plugin type and the fourth plugin type. The third plugin type responds with appropriate exit code when invoked. In an embodiment of the present invention, the plugin unit 236 is configured to pass an output json path while invoking the fourth plugin type start up scripts for estimating whether the process has succeeded or failed. The fourth plugin type writes into the JSON stating the success or failure status in the provided JSON path. The plugin unit 236 is configured to estimate whether the plugin process has been completed or not for the third plugin type and fourth plugin type.

In another embodiment of the present invention, the plugin unit 236 is configured to read plugin metadata and register the first plugin type, third plugin type and fourth plugin type based on a plugin manifest file loaded within a zipped package of the plugin type. In an exemplary embodiment of the present invention, the manifest file may be a PluginManifest.yaml file that carries the plugin metadata of the plugin type to be registered. In an example, the plugin manifest file for the first plugin type is illustrated as below:

Name: DotNet To DotNet Core Transformation
description: Transform legacy DotNet Framework applications to be compliant with DotNet Core
pluginType: runAsNewBlueprint
landingPagePath: home
resultPagePath: results-page
authorName: xyz
isEnabled: true
version: 6.1.0
pluginId: platform. DotnetToDotnetCore In another embodiment of the present invention, the plugin unit 236 is configured to read information provided in the plugin manifest file including name, description, plugin type, plugin manifest file version, plugin author, plugin implementation language, and the target source code language on which the plugin runs to accelerate greenfield application development or application source code transformation to cloud native code. In an embodiment of the present invention, the plugin unit 236 is configured to enable import of plugin types for registration and the plugin unit 236 provides an Application Program Interface (API) for the plugins to communicate with the plugin unit 236.

In an embodiment of the present invention, the plugin unit 236 is configured to add support to push plugin variants to cloud platform and activate the plugin variants. In an embodiment of the present invention, the plugin unit 236 provides an option to add one or more new plugin types in a semi-automated workflow to perform application source code transformation to cloud native code or development activity. In an exemplary embodiment of the present invention, the new plugin type may be the plugin variant that integrates Command Line Interface (CLI) based tools and the plugin variant that downloads and leverages Open-Source Software (OSS) tools in the workflow. In an exemplary embodiment of the present invention, one or more plugins may be combined/added together into a new semi-automated workflow. For example, if one plugin provides a functionality A and another plugin provides functionality B, when the user selects the first plugin and the second plugin the functionality A and B are applied respectively as part of a new semi-automated workflow.

In an embodiment of the present invention, the plugin unit 236 is configured to identify a best suitable plugin for a required application source code transformation to cloud native code or greenfield application development using Artificial Intelligence (AI). In an exemplary embodiment of the present invention, the plugin unit 236 comprises an Artificial Intelligence (AI) unit 238 (FIG. 2) that collects information from the user and based on the application source code uploaded by the user, the AI unit 238 may suggest suitability of a plugin for application source code transformation to cloud native code. In another exemplary embodiment of the present invention, based on the application source code uploaded by the user, the AI unit 238 suggests which plugin is most suitable for a greenfield application development.

In yet another exemplary embodiment of the present invention, the AI unit 238 comprises of machine learning capabilities that observes user behavior for suggesting a suitable plugin out of hundreds of plugins that may be registered on the plugin unit 236. The AI unit 238 may have a machine learning-powered interface configured to observe user behavior history and answer queries in english received from the user. In an exemplary embodiment of the present invention, the user may questions in plain english such as the following.

Question: How do I migrate my application to dotnet core?
Answer: "DotNet to DotNet Core Plugin"
Question: How do I generate swagger doc for my application?
Answer: "Add code for swagger Doc Plugin"
Question: How do I a security assessment for my application?
Answer: "Fault Vulnerability Assessment Plugin"

Figure 4J:
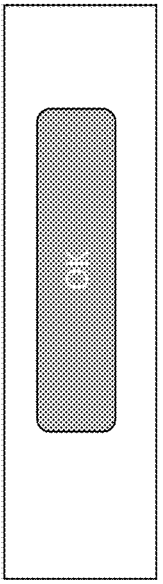
FIG. 4J illustrates a user interface showing a registration confirmation message for an example plugin .Net Framework App Transformer which is of the first plugin type, in accordance with an embodiment of the present invention.
Figure 4K:
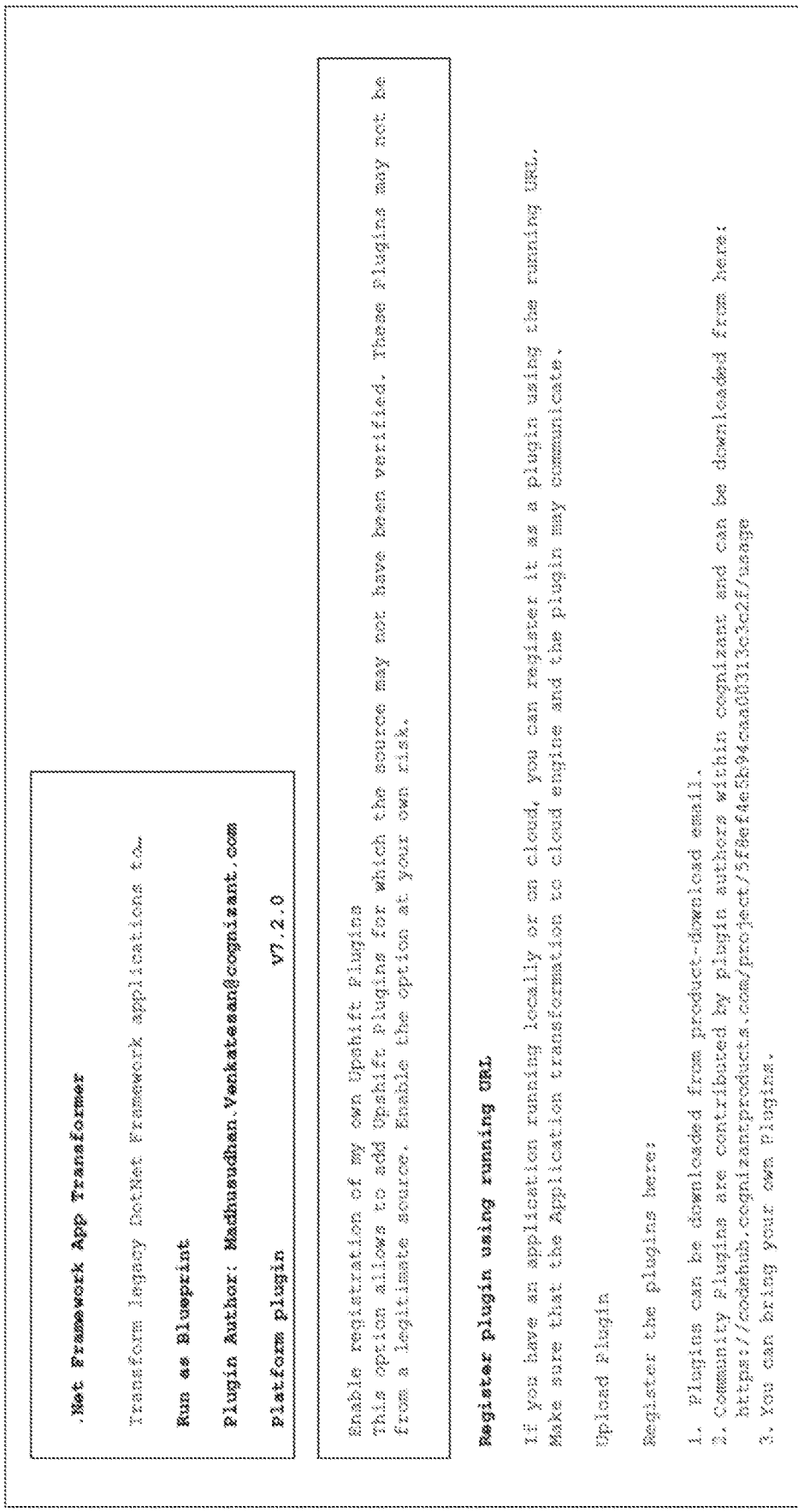
FIG. 4K illustrates listing of the .Net Framework App Transformer plugin, in accordance with an embodiment of the present invention.
Figure 4M:
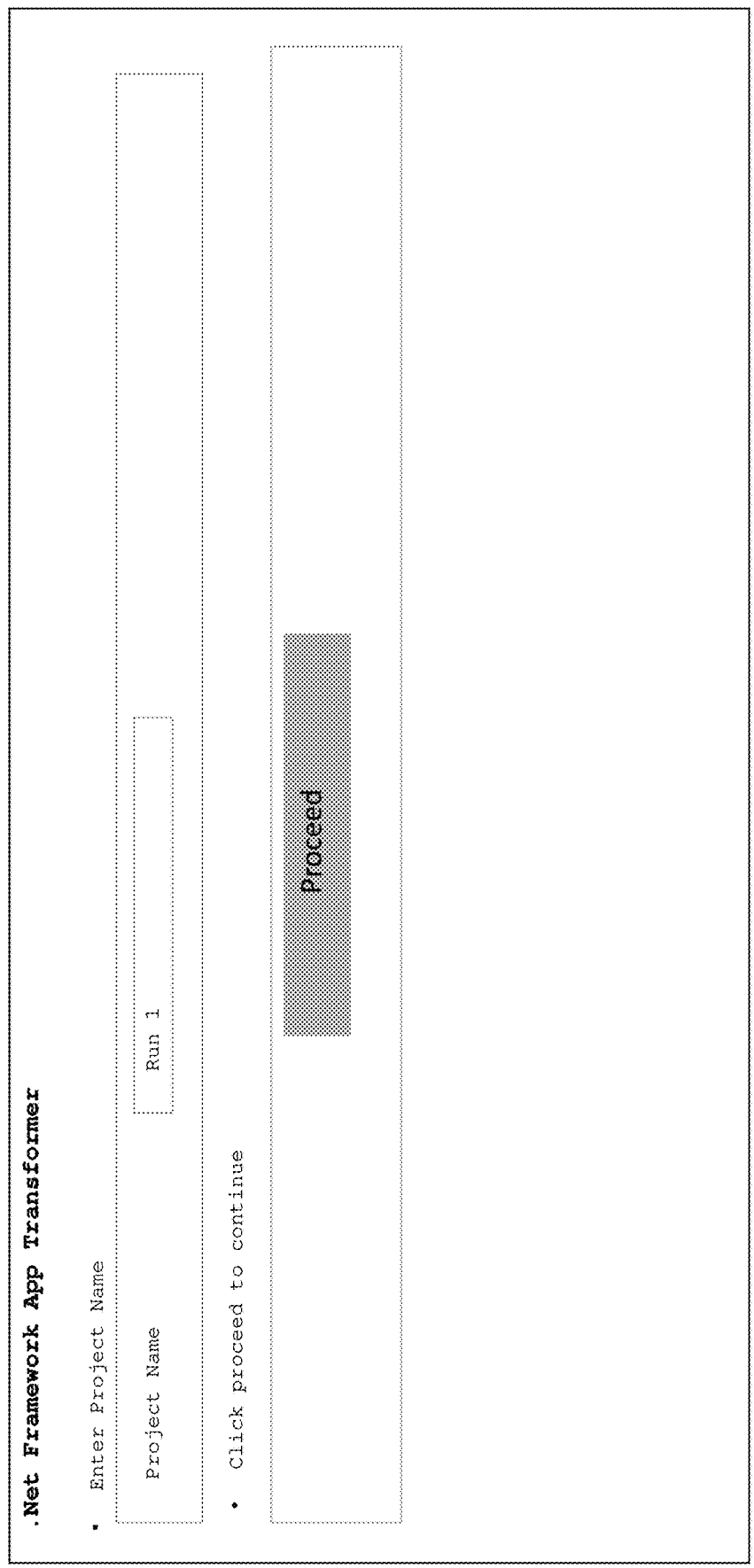
FIG. 4M illustrates a user interface rendering a unique name to identify the plugin semi-automated workflow, in accordance with an embodiment of the present invention.
Figure 4N:
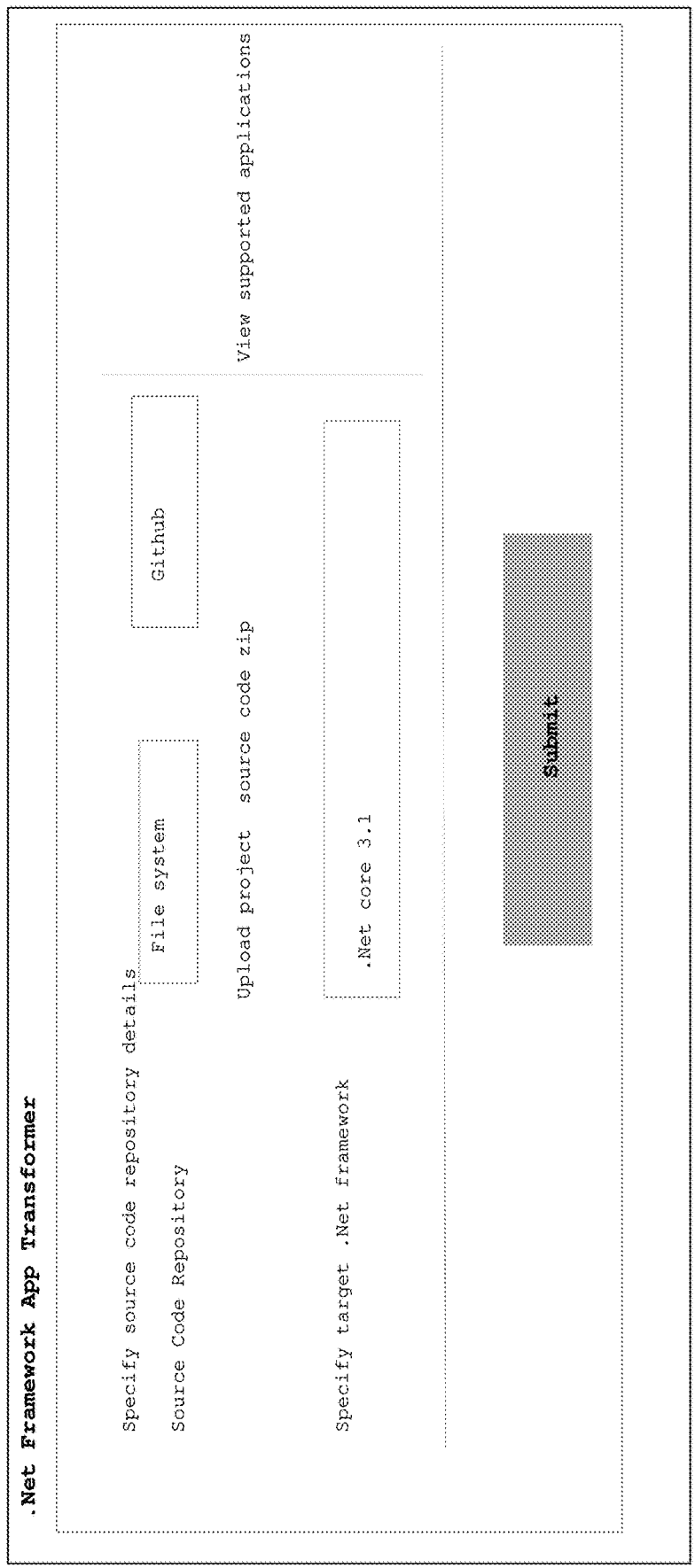
FIG. 4N illustrates an input page of the registered plugin, in accordance with an embodiment of the present invention.
Figure 40:
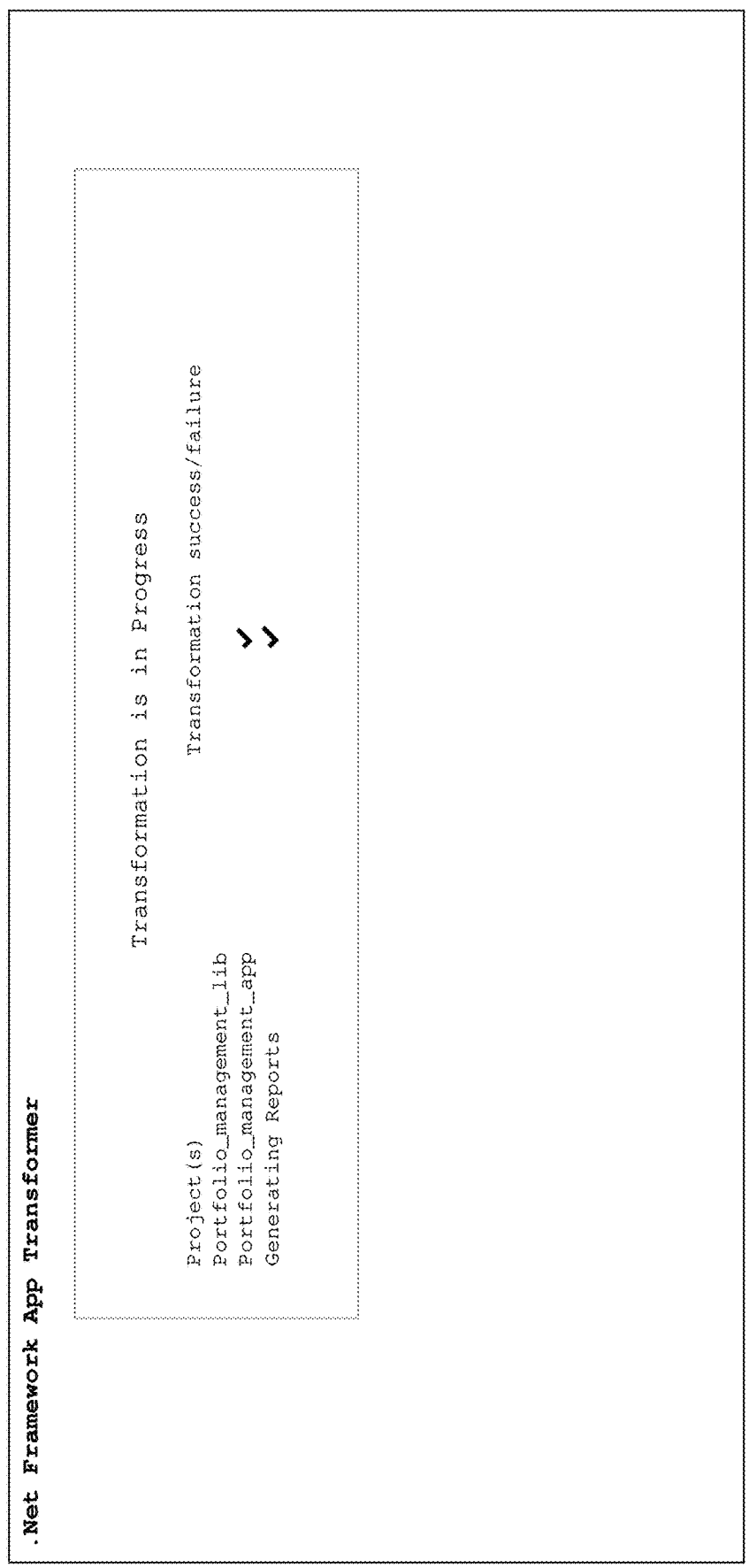

In accordance with an exemplary embodiment of the present invention, FIG. 4J illustrates a user interface showing registration confirmation message for a .Net Framework App Transformer plugin type which is of the first plugin type. In accordance with an exemplary embodiment of the present invention, FIG. 4K illustrates listing of the .Net Framework App Transformer plugin. In accordance with another exemplary embodiment of the present invention, FIG. 4L illustrates addition of the first plugin type or the second plugin type or the third plugin type based semi-automated workflow (.Net Framework App Transformer) with the existing semi-automated workflow (Accelerate Microservices Development, Assess Application Cloud Readiness, Move Application to Cloud etc.). In accordance with yet another exemplary embodiment of the present invention, FIG. 4M illustrates a user interface rendering a unique name to identify the plugin semi-automated workflow. In accordance with another exemplary embodiment of the present invention, FIG. 4N illustrates an input page of the registered plugin. In accordance with an exemplary embodiment of the present invention, FIG. 4O illustrates plugin screens that are displayed within the user interface of the plugin unit 236.

Figure 4S:
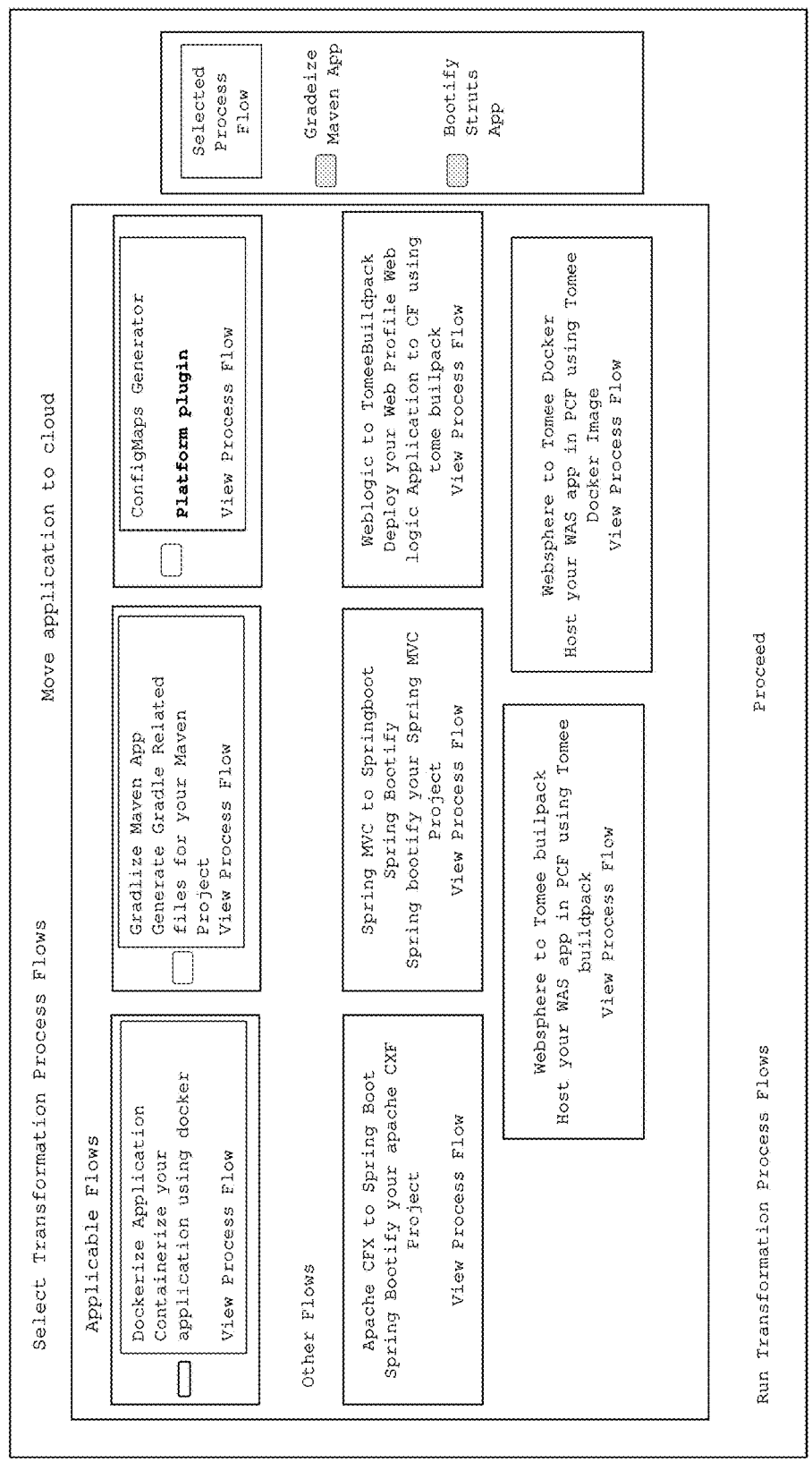
FIG. 4S illustrates addition of the fourth plugin type in the existing transformation recommendation paths, in accordance with an embodiment of the present invention.

Once the plugin workflow is completed, the results page of the plugin types is displayed within the user interface of the plugin unit 236 as illustrated in FIG. 4P, in accordance with an exemplary embodiment of the present invention. In accordance with an exemplary embodiment of the present invention, FIG. 4Q illustrates an example of the fourth plugin type where the fourth plugin type runs as the transformation recommendation path within existing semi-automated workflow. In accordance with another exemplary embodiment of the present invention, FIG. 4R illustrates a selection menu of the transformation recommendation paths for the fourth plugin type. In accordance with an exemplary embodiment of the present invention, FIG. 4S illustrates addition of the fourth plugin type in the existing transformation recommendation paths.

Figure 3:
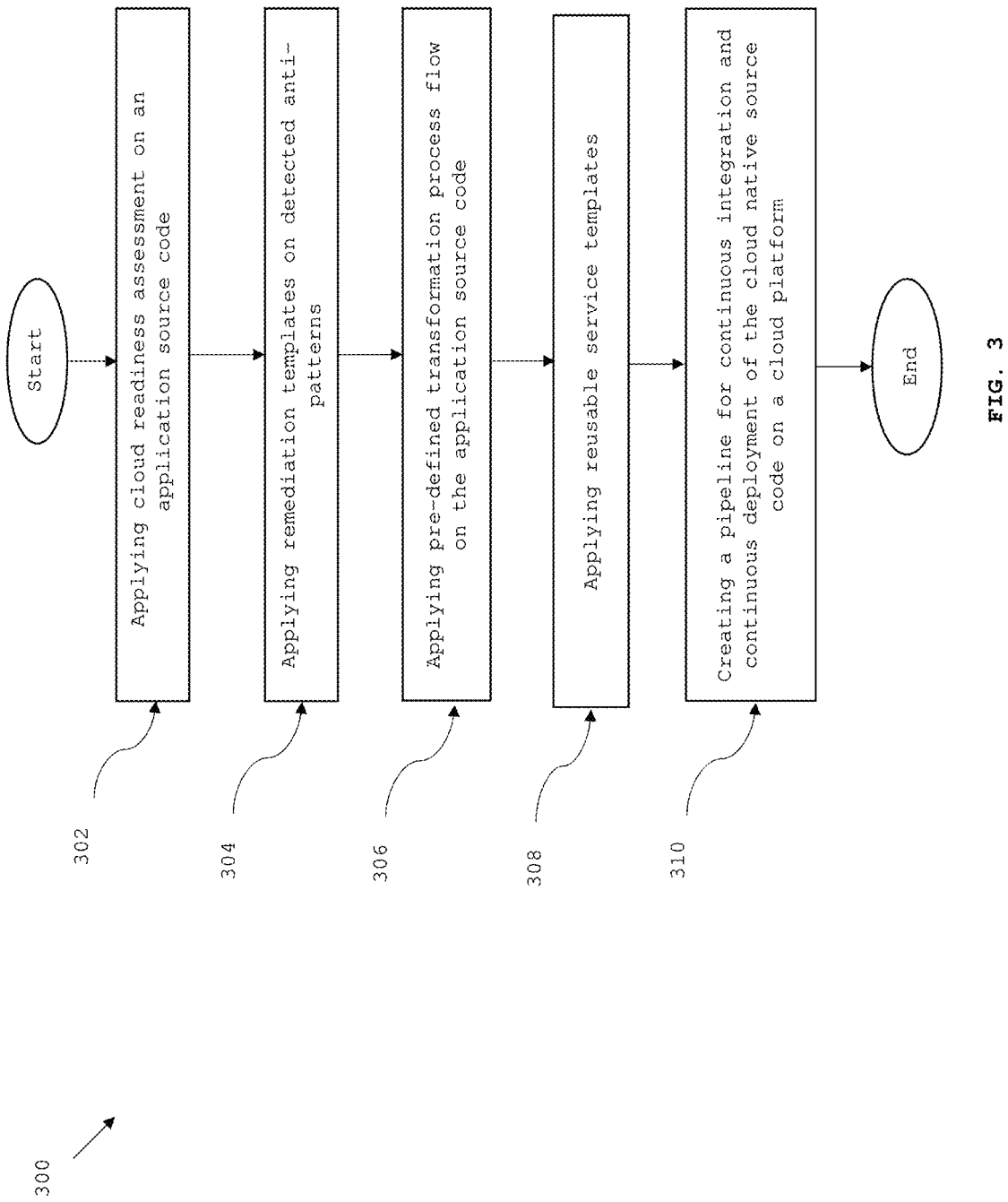
FIG. 3 is a flowchart illustrating a method for movement of application to cloud, in accordance with an embodiment of the present invention.

FIG. 3 is a flowchart illustrating a method for application transformation and cloud deployment by executing a semi-automated flow; in accordance with an embodiment of the present invention.

At step 302, cloud readiness assessment is applied on an application source code. In an embodiment of the present invention, the cloud readiness assessment is applied on the application source code and one or more migration transformation paths are recommended. In an embodiment of the present invention, the migration transformation recommendation includes a first transformation recommendation path. In an embodiment of the present invention, the first transformation recommendation path may be a "replatform" path which denotes that minimal code change would be required to move the application source code to the cloud platform. In another embodiment of the present invention, the migration transformation recommendation includes a second transformation recommendation path. In an exemplary embodiment of the present invention, the second transformation recommendation path may be a "refactor" path which denotes that a significant amount of changes to the source code would be required to move the application source code to the cloud platform. In yet another embodiment of the present invention, the migration transformation recommendation includes a third transformation recommendation path. In an exemplary embodiment of the present invention, the third transformation recommendation path may be a "rehost" path which denotes that the application source code can be moved to the cloud platform 230 with some configuration changes alone. In another embodiment of the present invention, the migration transformation recommendation includes a fourth transformation recommendation path. In an exemplary embodiment of the present invention, the fourth transformation recommendation path may be a "rebuild" path which denotes that the application source code cannot be reused and new application source code is to be written to host the application source code in the cloud platform 230. In an embodiment of the present invention, out of the transformation path recommendations, the cloud readiness assessment tool may suggest a particular transformation path recommendation which may be accepted by the user or may be overridden to choose another transformation path recommendation. In an exemplary embodiment of the present invention, the transformation path recommendations may be downloadable in a common separated values (CSV) format. In another embodiment of the present invention, the cloud readiness assessment report includes, but is not limited to technology stack stability and migration complexity.

At step 304, predefined remediation templates corresponding to anti-patterns are applied on the application source code to remediate the anti-patterns. In an embodiment of the present invention, the remediation templates comprise a set of actions performed to remediate the anti-pattern identified by the cloud assessment tool. In an embodiment of the present invention, the remediation unit implements the actions defined in the remediation templates on the application source code to remediate the anti-patterns. In an embodiment of the present invention, the remediation templates are applied based on the first and the second transformation recommendation paths.

At step 306, a pre-defined transformation process flow is applied on the application source code to transform the application source code into a cloud native code. In an embodiment of the present invention, the pre-defined transformation process flow is applicable based on the first and second migration transformation path recommendations. In particular, the pre-defined transformation process flow has a pre-processing, processing and post-processing stage. The pre-processing stage prepares the code on which the transformation has to be applied. In the processing stage, the transformation of the application source code to the cloud native code is executed in three distinct phases: "Detect" phase, "Analyze" phase and "Transform" phase.

In an embodiment of the present invention, in the detect phase it is determined if the pre-defined transformation process flow is applicable to the application source code. In another embodiment of the present invention, in the "analyze" phase, the application source code is analysed and the changes required to be made are determined for transformation of the application source code to the cloud native code. In another embodiment of the present invention, in the "transform" phase, the application source code is transformed to the cloud native code. In an exemplary embodiment of the present invention, the pre-defined transformation process flow includes a series of steps to transform the application source code into the cloud native code. In one example, the series of steps may include but are not limited to addition, deletion and modification of classes of the application source code.

In another example, the series of steps may include, but not limited to, addition, deletion and modification of configuration files. In yet another example, the series of steps may include building definitions of the classes of the application source code. In an embodiment of the present invention, the pre-defined transformation process flow may include modifying a configuration of the application source code or modifying the application source code itself. Examples of pre-defined transformation process flow for modifying the application code itself are provided in respect of the cloud native transformation unit 224. In the post-processing stage, additional recommendations are provided to the users.

At step 308, reusable service templates are defined based on the applied transformation process flow. In an embodiment of the present invention, the service templates apply repeatable code changes required for integration and deployment of the application source code to the cloud platform. In an embodiment of the present invention, the reusable service templates may be applied in the series of steps specified in the transformation process flow. In an exemplary embodiment, the distribution of the service templates may include distribution of a build configuration file that needs to be added to the applications source codes that is being transformed to the cloud native code. In an example, the service templates may include adding a new file with lines of codes and placeholders. In another example, the service template may include adding a build configuration for an application source code with Maven as build tool. In another example, the service templates may include adding a build configuration file for an application with Gradle as build tool. In another example, the service template may include adding a dependency in pom.xml file. In another example, the service template may include adding a filter bean configuration in web.xml file. In an embodiment of the present invention, the service templates are applied based on the first and the second transformation recommendation paths.

At step 310, a pipeline is created for continuous integration and deployment of the cloud native source code on a cloud platform. In an embodiment of the present invention, an option is provided to use an existing Continuous Integration/Continuous Deployment (CI/CD) pipeline template or create a new CI/CD pipeline from beginning via a graphical user interface. In an exemplary embodiment of the present invention, a deployment descriptor file Jenkins template creates a job to create the CI/CD pipeline such that the application source code is deployed onto the cloud platform based on the first, second and third transformation recommendation paths. In another embodiment of the present invention, the service templates are used create the CI/CD pipeline. In an embodiment of the present invention, support for cloud deployment is added for container and Orchestration platforms such as Docker and Kubernetes. In an exemplary embodiment of the present invention, a new CI/CD pipeline is created with a plurality of user-defined stages such as unit testing, static code analysis, deployment strategy, security checks, cloud readiness analysis, and notification channels.

Advantageously, the invention provides an integrated end-to-end process steps to kick start application cloud migration. It automates cloud native development, cloud readiness assessment, application code transformation, and creates and triggers CI/CD pipelines for Continuous Integration, Continuous Delivery and Continuous Deployment.

The system serves as an intelligent platform that crawls through an application source code, understands the landscape, structure, code & configurations and suggests suitable migration path specific to the application. No two applications will undergo the same transformation path as the system applies specific transformation steps based on the assessment findings for a particular application.

The transformation process flow that are applied as part of the semi-automated workflow are tried and tested automated transformation steps built based on the knowledge accumulated from extensive and deep cloud migration experiences of the cloud migration experts. The application transformation to cloud system lists the applicable transformation process flow for a particular application and also provides recommendations on the further manual actions to be performed on the application code. The transformation process flow facilitate migration teams with reusable transformation and cloud platform specific knowledge that can be applied to future transformation initiatives. The application transformation to cloud system saves the effort for identifying the correct transformation path by weeks.

The application to cloud transformation system reduces manual effort and brings in accuracy by integrating tools that automates the development and migration steps. In the cloud transformation journey, based on the emerging needs, the workflow steps can be customized with minimum code changes and several tools can be added or removed, enabling process improvement along the journey. The adaptable plugin framework of the system provides for seamlessly adding additional functionalities for accelerating greenfield application development or application to cloud transformation.

Figure 5:
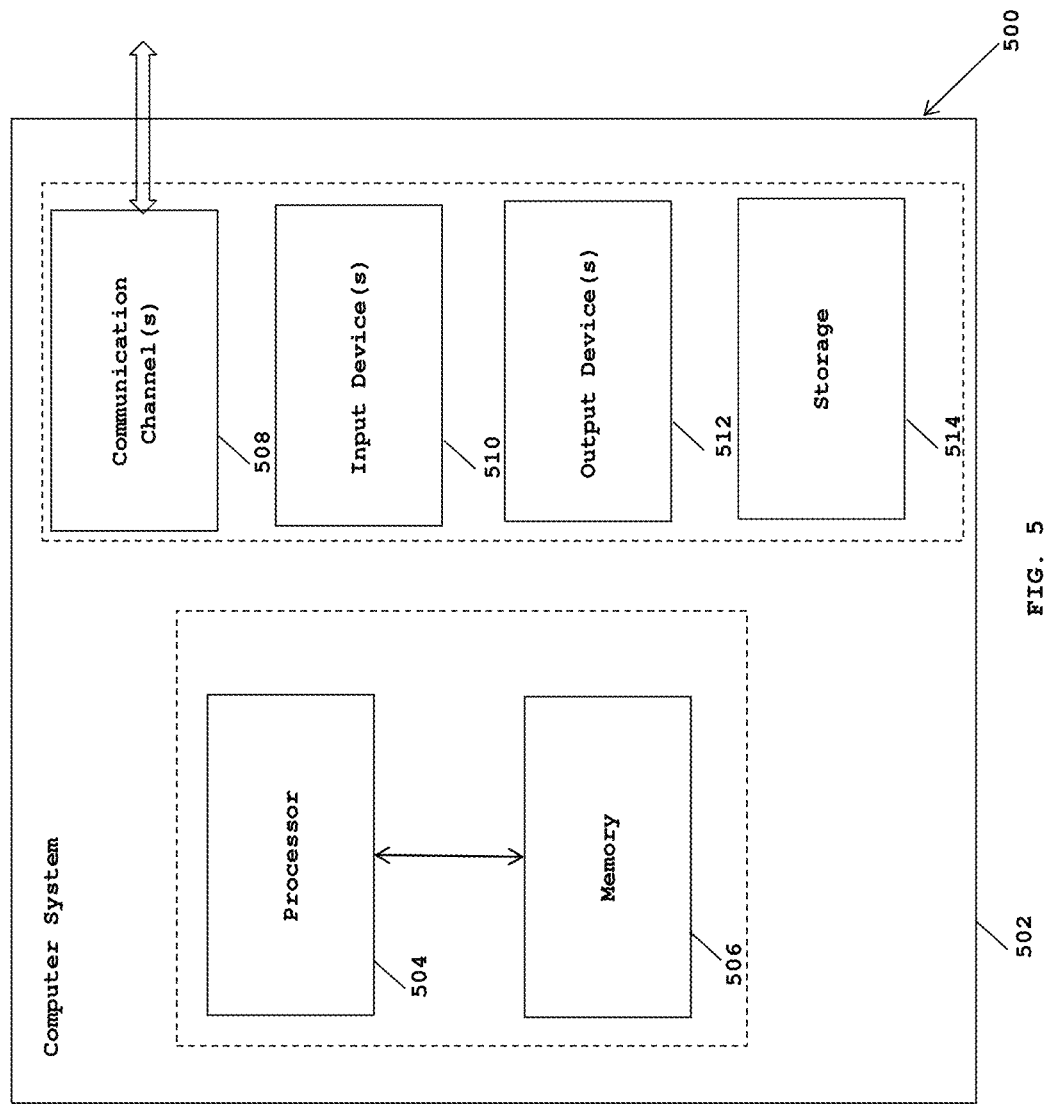
FIG. 5 illustrates an exemplary computer system in which various embodiments of the present invention may be implemented.

FIG. 5 illustrates an exemplary computer system in which various embodiments of the present invention may be implemented. The computer system 502 comprises a processor 504 and a memory 506. The processor 504 executes program instructions and is a real processor. The computer system 502 is not intended to suggest any limitation as to scope of use or functionality of described embodiments. For example, the computer system 502 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 506 may store software for implementing an embodiment of the present invention. The computer system 502 may have additional components. For example, the computer system 502 includes one or more communication channels 508, one or more input devices 510, one or more output devices 512, and storage 514. An interconnection mechanism (not shown) such as a bus, controller, or network, interconnects the components of the computer system 502. In an embodiments of the present invention, operating system software (not shown) provides an operating environment for various softwares executing in the computer system 502, and manages different functionalities of the components of the computer system 502.

The communication channel(s) 508 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 510 may include, but not limited to, a keyboard, mouse, pen, joystick, trackball, a voice device, a scanning device, touch screen or any another device that is capable of providing input to the computer system 502. In an embodiment of the present invention, the input device(s) 510 may be a sound card or similar device that accepts audio input in analog or digital form. The output device(s) 512 may include, but not limited to, a user interface on CRT or LCD, printer, speaker, CD/DVD writer, or any other device that provides output from the computer system 502.

The storage 514 may include, but not limited to, magnetic disks, magnetic tapes, CD-ROMs, CD-RWs, DVDs, flash drives or any other medium which can be used to store information and can be accessed by the computer system 502. In an embodiment of the present invention, the storage 514 contains program instructions for implementing the described embodiments.

The present invention may suitably be embodied as a computer program product for use with the computer system 502. The method described herein is typically implemented as a computer program product, comprising a set of program instructions which is executed by the computer system 502 or any other similar device. The set of program instructions may be a series of computer readable codes stored on a tangible medium, such as a computer readable storage medium (storage 514), for example, diskette, CD-ROM, ROM, flash drives or hard disk, or transmittable to the computer system 502, via a modem or other interface device, over either a tangible medium, including but not limited to optical or analogue communications channel(s) 508. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A system for application transformation to cloud by conversion of an application source code to a cloud native code, the system comprising:
    a memory storing program instructions; a processor configured to execute program instructions stored in the memory; and an application transformation to cloud engine executed by the processor and configured to:
    receive a first and a second transformation recommendation paths;
    apply a set of remediation templates based on the first and the second transformation recommendation paths, wherein the set of remediation steps comprises pre-defined parameterized actions;
    apply a pre-defined transformation process flow on the application source code based on the first and the second transformation recommendation paths, wherein the pre-defined transformation process flow includes a pre-processing stage involving analyzing the source code and a target framework, and determination of dependencies, wherein the pre-defined transformation process flow is executed in a "detect" phase, "analyze" phase and "transform" phase and wherein the "detect" phase determines if the pre-defined transformation process flow is applicable to the application source code;
    apply a reusable service template on the application source code, based on the first and the second transformation recommendation paths, wherein the reusable service template applies repeatable code changes required for integration and deployment of the cloud native code to a cloud platform.

2. The system as claimed in claim 1, wherein the system comprises a plugin unit configured to provide an adaptable plugin framework for creating plugin types as per required specifications.

3. The system as claimed in claim 2, wherein the adaptable plugin framework allows addition of a semi-automated workflow that applies a functionality to accelerate application development or application to cloud transformation or addition of a set of semi-automated steps to accelerate greenfield application development and application source code transformation to cloud native code, and wherein the functionality may include assessment of application source code and generation of application source code.

4. The system as claimed in claim 3, wherein the adaptable plugin framework is configurable to register a first plugin type via a zipped package, wherein the plugin unit manages lifecycle of the first plugin type.

5. The system as claimed in claim 3, wherein the adaptable plugin framework is configurable to register a second plugin type by providing the second plugin type in an application's local or external-running Uniform Resource Locator (URL).

6. The system as claimed in claim 3, wherein the adaptable plugin framework is configured to register a third plugin type by uploading a zipped package, and wherein the plugin unit automates user interface (UI) creation for an input page and results page of the third plugin type.

7. The system as claimed in claim 3, wherein the adaptable plugin framework is configurable to register a fourth plugin type, and wherein the plugin unit runs the fourth plugin type as a transformation recommendation path within existing semi-automated workflow for application source code transformation to cloud native code.

8. The system as claimed in claim 2, wherein the plugin unit is configured to provide a yml based language agnostic model to register and run the plugin types.

9. The system as claimed in claim 7, wherein the plugin unit is configured to allow registration of the fourth plugin type as a set of automated steps that may be added as a custom transformation recommendation path in the first and the second transformation recommendation paths to transform the application source code to the cloud native code.

10. The system as claimed in claim 7, wherein the plugin unit is configured to allow registration of the fourth plugin type as a set of semi-automated steps that are added as a custom greenfield transformation path to accelerate greenfield application source code development.

11. The system as claimed in claim 5, wherein the plugin unit is configured to allow registration of the second plugin type as a custom semi-automated workflow that applies a functionality to accelerate application greenfield development or application source code transformation to native code by loading a User Interface (UI) within the application transformation to cloud engine using a Uniform Resource Locator (URL) provided during registration of the second plugin type, and wherein the second plugin type is supported in local and docker installers.

12. The system as claimed in claim 6, wherein the plugin unit is configured to allow registration of the third plugin type as a custom semi-automated workflow that applies a functionality to accelerate application source code greenfield development or application source code transformation to cloud native code.

13. The system as claimed in claim 6, wherein the plugin unit is configured to receive inputs in the form of a JSON file during registration.

14. The system as claimed in claim 2, wherein the plugin unit comprises a data persistence unit to store plugin data as key-value pairs.

15. The system as claimed in claim 2, wherein the plugin unit is configured to enable or disable the plugin types, filter the plugin types via a programming language, search the plugin types using keywords, provide help information pertaining to the plugin types, and delete the running plugin types.

16. The system as claimed in claim 2, wherein the plugin unit supports a second plugin type, a third plugin type and a fourth plugin type when the application transformation to cloud engine is running locally or as a docker or on cloud platform.

17. The system as claimed in claim 2, wherein the plugin unit receives a status message via an API call or via a javascript from a first plugin type and a second plugin type.

18. The system as claimed in claim 2, wherein the plugin unit comprises a third plugin type and a fourth plugin type which are short running processes and the plugin unit automatically estimates when the third plugin type and the fourth plugin type complete execution.

19. The system as claimed in claim 2, wherein the plugin unit is configured to pass an output json path while invoking a start up script for a fourth plugin type for estimating whether the process has succeeded or failed.

20. The system as claimed in claim 2, wherein the plugin unit is configured to read plugin metadata and register the plugin types based on a manifest file loaded within a zipped package of the plugin type.

21. The system as claimed in claim 2, wherein the plugin unit comprises a manifest file that carries plugin metadata of the plugin type to be registered.

22. The system as claimed in claim 2, wherein the plugin unit provides an option to add one or more new plugin types in a semi-automated workflow to perform application source code transformation to cloud native code or development activity, wherein the new plugin type may be a plugin type that integrates Command Line Interface (CLI) based tools and downloads and leverages Open-Source Software (OSS) tools in the semi-automated workflow.

23. The system as claimed in claim 2, wherein the plugin unit is configured to read information provided in a plugin manifest file including name, description, plugin type, plugin manifest file version, plugin author, plugin implementation language, and a target source code language on which the plugin runs to accelerate greenfield application development or application transformation to cloud.

24. The system as claimed in claim 2, wherein the plugin unit comprises an Artificial Intelligence (AI) unit configured to identify suitable plugin types for a required application cloud transformation or greenfield application development.

25. The system as claimed in claim 24, wherein the AI unit is configured to:
   collect information from a user and based on the application source code uploaded by the user provide suggestions to the user related to a suitable plugin type for the application source code cloud transformation;
   provide suggestions related to a suitable plugin type for greenfield application development based on application source code uploaded by the user; and
   provide suggestions related to suitable plugin types based on user behavior.

26. The system as claimed in claim 25, wherein the AI unit is configured to observe user behavior for suggesting a suitable plugin type and answer queries received from the user.

* * * * *